United States Patent
Kikuchi et al.

(10) Patent No.: US 6,866,959 B2
(45) Date of Patent: Mar. 15, 2005

(54) FUEL CELL

(75) Inventors: Hideaki Kikuchi, Kawachi-gun (JP); Narutoshi Sugita, Utsunomiya (JP); Yoshihiro Nakanishi, Kawachi-gun (JP); Tadashi Nishiyama, Shioya-gun (JP); Keisuke Andou, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/328,878

(22) Filed: Dec. 24, 2002

(65) Prior Publication Data

US 2003/0129474 A1 Jul. 10, 2003

(30) Foreign Application Priority Data

Dec. 26, 2001 (JP) ........................... 2001-393620

(51) Int. Cl.⁷ .................................. H01M 8/04
(52) U.S. Cl. .................. 429/38; 429/26; 429/34
(58) Field of Search ..................... 429/38, 26, 34

(56) References Cited

U.S. PATENT DOCUMENTS

| | | | |
|---|---|---|---|
| 6,066,409 A | 5/2000 | Ronne et al. | |
| 2003/0087140 A1 * | 5/2003 | Kikuchi et al. | 429/26 |
| 2003/0235752 A1 * | 12/2003 | England et al. | 429/40 |

FOREIGN PATENT DOCUMENTS

| | | |
|---|---|---|
| EP | 1083616 A2 | 3/2001 |
| JP | 10-74530 | 3/1998 |
| JP | 2001-6696 | 1/2001 |
| JP | 2001-148252 | 5/2001 |
| JP | 2002-298875 | 10/2002 |

* cited by examiner

Primary Examiner—John S. Maples
(74) Attorney, Agent, or Firm—Anthony A. Laurentano; Lahive & Cockfield, LLP

(57) ABSTRACT

A fuel cell is provided that has a sufficient sealing performance while having a restrained dimension in the stacking direction thereof. The fuel cell is formed by stacking a plurality of fuel cell units, each fuel cell unit comprising: an electrode assembly formed by disposing electrodes on both sides of an electrolyte; a pair of separators that sandwich the electrode assembly in the thickness direction thereof; and gas sealing members that are disposed at an outer peripheral portion of the electrode assembly, and that seal respective reaction gas flow passages that are formed between each separator and the electrode assembly and are bounded by the separators and electrode assembly. In each of the separators, there are provided reaction gas communication ports that are provided outward from the gas sealing members, in one separator, through paths are formed that penetrate the separator in the thickness direction thereof and connect the reaction gas communication ports with the reaction gas flow passages, and in the other separator, reaction gas communication paths are formed that detour around the gas sealing member in the thickness direction of the separator and connect the reaction gas communication ports with the reaction gas flow passages.

8 Claims, 16 Drawing Sheets

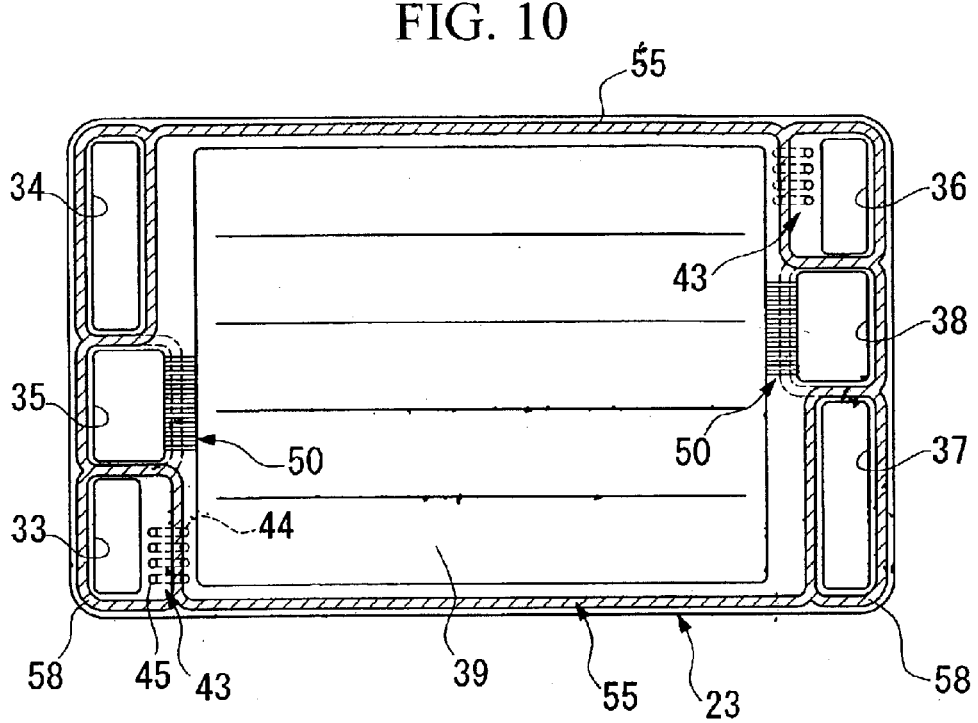
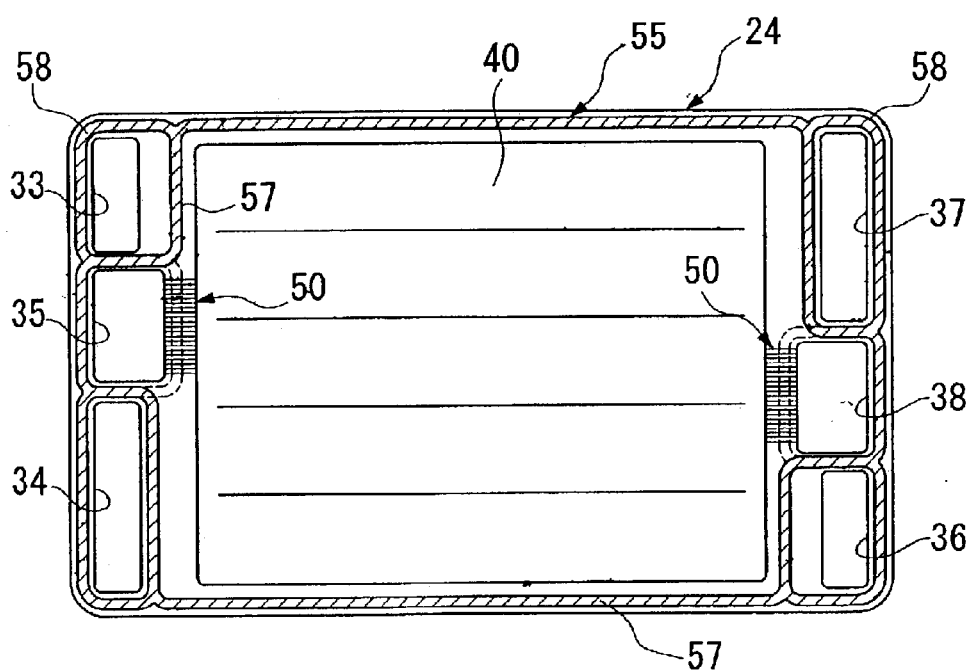

FUEL CELL

BACKGROUND OF THE INVENTION

1. Field of the Invention

The present invention relates to a fuel cell formed by stacking a plurality of fuel cell units that are formed by sandwiching an electrode assembly between separators.

2. Description of the Related Art

Among fuel cell units, there is one type that is formed in a plate shape by sandwiching between a pair of separators an electrode assembly that is formed by placing an anode electrode and a cathode electrode respectively on either side of a solid polymer electrolyte membrane. A fuel cell is formed by stacking in the thickness direction of the fuel cell units a plurality of fuel cell units that are structured in this way.

In each fuel cell unit there is provided a flow passage for fuel gas (for example, hydrogen) on the surface of the anode side separator that is positioned facing the anode electrode, and there is provided a flow passage for oxidizing gas (for example, air that contains oxygen) on the surface of the cathode side separator that is positioned facing the cathode electrode. In addition, a flow passage for a cooling medium (for example, pure water) is provided between adjacent separators of adjacent fuel cell units.

When fuel gas is supplied to the electrode reaction surface of the anode electrode, hydrogen is ionized here and moves to the cathode electrode via the solid polymer electrolyte membrane. Electrons generated during this reaction are extracted to an external circuit and used as direct current electrical energy. Because oxidizing gas is supplied to the cathode electrode, hydrogen ions, electrons, and oxygen react to generate water. Because heat is generated when water is created at the electrode reaction surface, the electrode reaction surface is cooled by a cooling medium made to flow between the separators.

The fuel gas, oxidizing gas (generically known as reaction gas), and the cooling medium each need to flow through a separate flow passage. Therefore, sealing technology that keeps each flow passage sealed in a fluid-tight or airtight condition is essential.

Examples of portions that must be sealed are: the peripheries of supply ports that are formed so as to penetrate the separators in the thickness direction thereof in order to supply and distribute reaction gas and cooling medium to each fuel cell unit of the fuel cell; the peripheries of discharge ports that are formed so as to penetrate the separators in the thickness direction thereof in order to collect and discharge the reaction gas and cooling medium that are discharged from each fuel cell unit; the outer peripheries of the electrode assemblies; and the space between the separators of adjacent fuel cell units. Organic rubber that is soft yet also has the appropriate resiliency or the like is employed as the material for the sealing member.

FIG. 35 is a plan view showing a conventional fuel cell stack. In FIG. 35 the reference numeral 4 indicates a communication port such as a fuel gas supply port and discharge port, an oxidizing gas supply port and discharge port, and a cooling medium supply port and discharge port that each penetrate the fuel cell stack 1 in the direction in which separators 2 and 3 are stacked. The reference numeral 5 indicates an area in which a plurality of fuel gas flow passages, oxidizing gas flow passages, and cooling medium flow passages running along the separators 2 and 3 are formed.

FIG. 36 is a longitudinal cross-sectional view of a conventional fuel cell stack 1 taken along the line X—X in FIG. 36. As can be seen in plan view, in order to make the space occupied by the sealing member, that does not contribute to power generation, as small as possible, conventionally, by locating gas sealing members 8 and 9, which respectively seal a fuel gas flow passage 6 and an oxidizing gas flow passage 7, together with a cooling surface sealing member 10, which seals a cooling medium flow passage, aligned in a row in the stacking direction of the fuel cell units 11, the outer dimensions in the stacking direction of the fuel cell stack 1 are minimized.

According to FIG. 36, the fuel gas supply port 4 and the fuel gas flow passage 6 that are isolated in a sealed state by the gas sealing members 8 and 9 are connected by a communication path 12. The communication path 12 is provided so as to detour around, in the thickness direction of the separator 2, the gas sealing member 8 that seals the entire periphery of the fuel gas flow passage 6. More specifically, the communication path 12 is formed in such a way that grooves are formed between the fuel gas supply port 4 and fuel gas flow passage 6 of the separator 2, and a bridge plate 13 is provided over the grooves.

Moreover, the separator 3 also has a similar communication path (not shown) near the oxidizing gas communication port (not shown). Such a structure is disclosed in Japanese Unexamined Patent Application, First Publication No. Hei 10-74530.

However, because the bridge plate 13 is a separate element that is installed on the separator 2 so as to be substantially flush with the separator 2, a gap 14 is inevitable between the separator 2 and bridge plate 13 at a connecting portion therebetween, as shown in FIG. 37 (the same description applies in the case of the separator 3). FIG. 37 is a longitudinal cross-sectional view, showing a conventional fuel cell stack 1, taken along the line Y—Y in FIG. 36. The drawback with this structure is that sealing performance may be lost if the gas sealing members 8 and 9 are deformed in the gap 14 when the gas sealing members 8 and 9 are attached onto the separators 2 and 3 and the bridge plate 13. Moreover, another drawback is that it is very difficult to form the gas sealing members 8 and 9 on the separators 2 and 3 and the bridge plate 13, because the material of the gas sealing members 8 and 9 may leak through the gap 14.

As disclosed in Japanese Unexamined Patent Application, First Publication No. 2001-148252 and U.S. Pat. No. 6,066,409, a technique in which through holes are formed in a separator that penetrate in the thickness direction of the separator, and a reaction gas is made to flow into a gas flow passage via the through holes, has been proposed. However, in such a structure, a problem is experienced in that, because reaction gas flow passages must be formed between the adjacent separators not only on the front surface of the separator but also on the rear surface thereof in order to allow the reaction gas to flow from the gas flow passage on the rear surface (cooling surface) to the gas flow passage on the front surface or vice versa, the thickness of the fuel cell units may be increased by the amount necessary to form these flow passages.

Moreover, it is necessary to locate the cooling surface sealing member so as to be offset inward (toward a reaction surface) from the gas sealing member for ensuring a space to form the through paths in order to allow the reaction gas to flow in from the rear surface of the separator because the cooling surface sealing member that seals the cooling medium flow passage is provided on the rear surface of the separator. As a result of locating the cooling surface sealing member so as to be offset from the gas sealing member, the cooling surface sealing member is located at a position overlapping, as viewed in the stacking direction, with the reaction gas flow passage that is located inward from the gas sealing member. In this case, the minimum thickness of the fuel cell unit equals to the sum of the thickness of the reaction gas flow passage and the thickness of the cooling surface sealing member. Moreover, if the through holes are provided not only on the separator adjacent to one electrode but also on the separator adjacent to the other electrode, the minimum thickness of the fuel cell is doubled. If a fuel cell stack is formed by stacking a plurality of such fuel cell units, the overall thickness of the fuel cell stack is found by multiplying the number of stacks by the minimum thickness of each fuel cell unit, which makes it difficult to reduce the size of the fuel cell stack.

SUMMARY OF THE INVENTION

The present invention was conceived in view of the above circumstances, and it is an object thereof to provide a fuel cell whose dimension in the stacking direction is restrained while ensuring sealing performance, and in which the sealing performance may be further improved by forming the gas sealing member integrally with the separator.

In order to solve the above problems, a first aspect of the present invention provides a fuel cell formed by stacking a plurality of fuel cell units, each fuel cell unit comprising: an electrode assembly formed by disposing electrodes on both sides of an electrolyte; a pair of separators that sandwich the electrode assembly in the thickness direction thereof; and gas sealing members that are disposed at an outer peripheral portion of the electrode assembly, and that seal respective reaction gas flow passages that are formed between each separator and the electrode assembly and are bounded by the separators and electrode assembly, wherein, in each of the separators there are provided reaction gas communication ports that are provided outward from the gas sealing members, wherein, in one separator, through paths are formed that penetrate the separator in the thickness direction thereof and connect the reaction gas communication ports with the reaction gas flow passages, and in the other separator, reaction gas communication paths) are formed that detour around the gas sealing member in the thickness direction of the separator and connect the reaction gas communication ports with the reaction gas flow passages.

According to the fuel cell as constructed above, in the one separator, because the reaction gas communication ports are connected with the reaction gas flow passages by the through paths, the reaction gas communication paths need not be formed therein. Therefore, because a gap accompanied with the communication paths may not be formed on the front surface (the surface forming the reaction gas flow passage) of the separator, the portion, between the reaction gas communication ports and reaction gas flow passage, where the gas sealing member is formed can be made flat. As a result, the leakage of the material of the gas sealing member during formation thereof can be prevented, the deformation of the gas sealing member can be prevented, the gas sealing member can be securely bonded to the predetermined position on the separator, and thus the sealing performance of the gas sealing member is improved. Moreover, the reaction gas flow passage can be sealed in a fluid tight state by making the gas sealing member formed on the one separator and the gas sealing member bonded to the electrolyte of the electrode assembly be pressed against the other separator.

In addition, in the other separator, the reaction gas need not flow along the rear surface (the surface to be cooled) of this separator because the reaction gas communication ports are connected with the reaction gas flow passage by the communication paths, accordingly, the cooling surface sealing member need not be formed at a position overlapping, as viewed in the stacking direction, with the reaction gas flow passage. As a result, by providing the cooling surface sealing member so as to be offset, as viewed in the stacking direction, from the reaction gas flow passage, the dimensions of the fuel cell units, consequently, the dimensions of the fuel cell stack in the stacking direction can be reduced by the amount saved by the above-mentioned offset disposition.

Although the aforementioned gap is formed at a connecting portion between the other separator and the communication paths, the gap can be sealed by making the gas sealing member bonded to the one separator and to the electrolyte be pressed against the gap.

In the fuel cell according to a second aspect of the present invention, the planar area of the electrode contacting the other separator is formed to be larger than that of the electrode contacting the one separator by an amount corresponding to at least the width of the gas sealing member.

According to the fuel cell as constructed above, a portion of the electrolyte that extends out of the electrode (smaller electrode) contacting the one separator can be supported, in the thickness direction thereof, by the electrode (larger electrode) contacting the other separator. It is possible to bond the gas sealing member to the one separator so that the gas sealing member contacts the supported portion of the electrolyte. As a result, the gas sealing member can be pressed against the electrolyte while ensuring the strength of the electrolyte in the thickness direction thereof.

If the supported portion is made of sealing material instead of a material for the electrode, the sealing performance at the portion can be further improved. The planar area of the electrolyte may be formed larger than that of the larger electrode, or may be formed as large as that of the larger electrode. If the planar area of the electrolyte is larger than that of the larger electrode, the gas sealing member may be bonded to the peripheral portion of the electrolyte.

In the fuel cell according to a third aspect of the present invention, the gas sealing member is provided such that the gas sealing member is bonded to the one separator and is pressed against the electrode assembly as well as against the other separator.

According to the fuel cell as constructed above, by making the gas sealing member be pressed against the electrode assembly, the leakage of the reaction gas from the space delimited by the electrode assembly can be prevented, and by making the gas sealing member be pressed against the other separator, the leakage of the reaction gas to the outside can also be prevented.

In the fuel cell according to the present invention, a cooling medium flow passage for cooling the fuel cell units may be formed in every space between the fuel cell units adjacent to each other.

In the fuel cell according to the present invention, two or more fuel cell units may form a group of fuel cell units, and a cooling medium flow passage for cooling the fuel cell units may be formed in every space between adjacent groups of fuel cell units.

In the fuel cell according to the present invention, in the electrodes forming the electrode assembly, the planar area of one electrode may be formed as substantially the same size as that of the electrolyte.

In the fuel cell according to the present invention, the separators may be formed of metal plates by press forming.

BRIEF DESCRIPTION OF THE DRAWINGS

FIG. 10 is a plan view showing a state in which the cooling surface sealing member is provided on the separator shown in FIG. 5.

FIG. 11 is a plan view showing a state in which the cooling surface sealing member is provided on the separator shown in FIG. 6.

DETAILED DESCRIPTION OF THE PREFERRED EMBODIMENTS

The fuel cell stack according to an embodiment of the present invention will now be described in detail with reference to the drawings.

Figure 1:
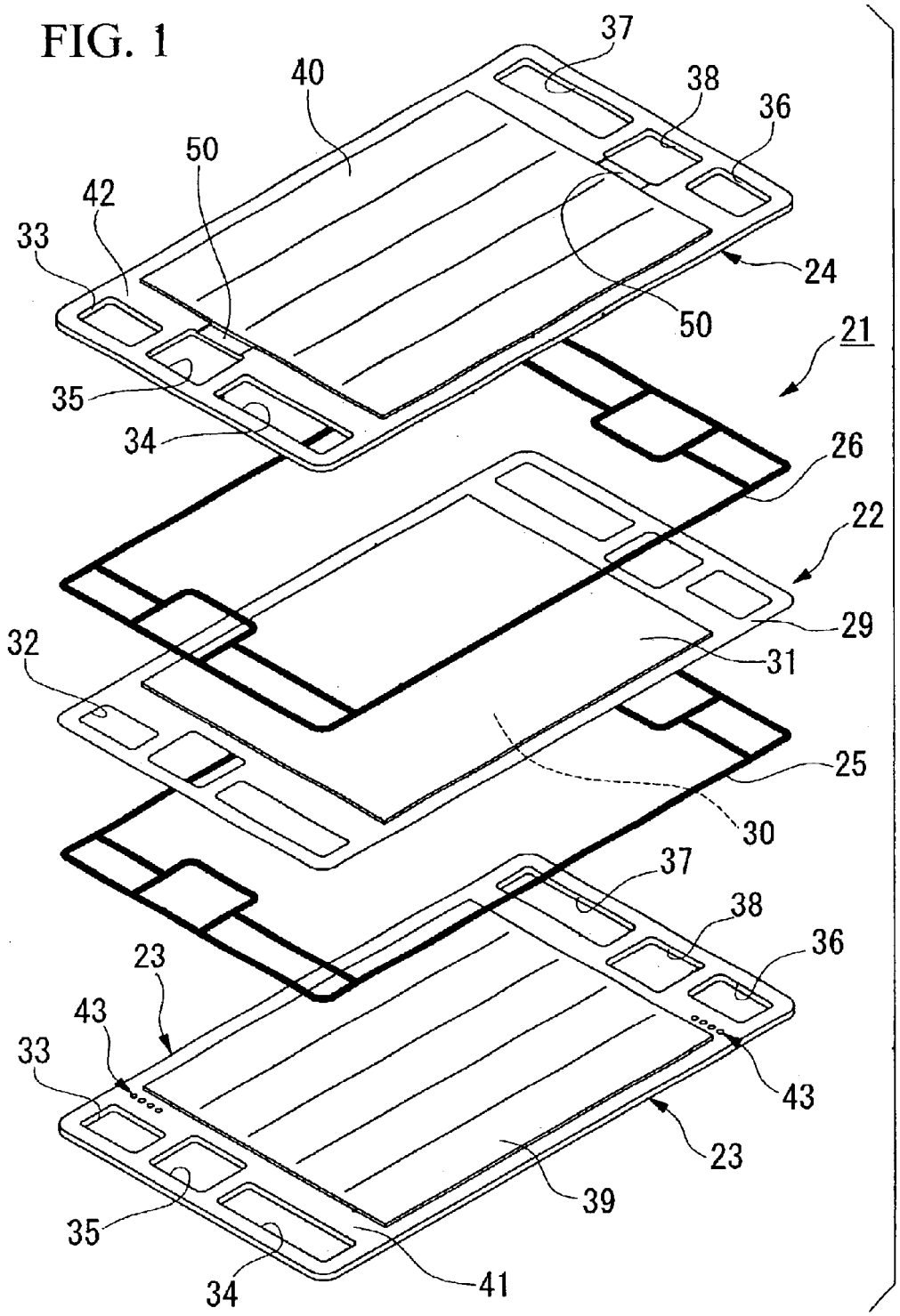
FIG. 1 is an exploded perspective view schematically showing a fuel cell unit forming the fuel cell stack according to a first embodiment of the present invention.
Figure 12:
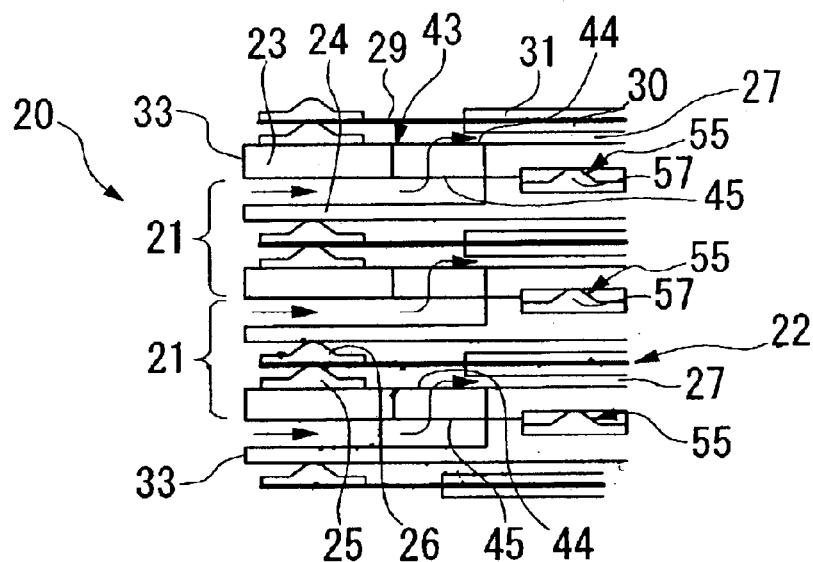
FIG. 12 is a longitudinal cross-sectional view, showing the fuel cell stack shown in FIG. 1, taken along the line A—A in FIG. 7.
Figure 13:
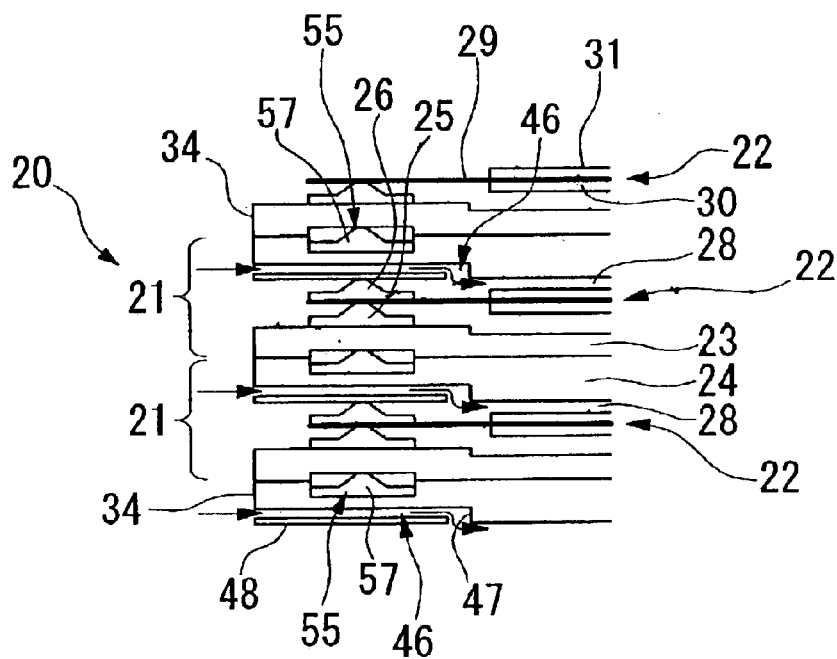
FIG. 13 is a longitudinal cross-sectional view, showing the fuel cell stack shown in FIG. 1, taken along the line B—B in FIG. 7.

As shown in FIG. 12, the fuel cell stack 20 according to the present embodiment is formed by stacking a plurality of fuel cell units 21. As shown in FIG. 1, the fuel cell unit 21 is formed by sandwiching an electrode assembly 22 between a pair of separators 23 and 24. Between the electrode assembly 22 and each of the separators 23 and 24 are disposed respectively gas sealing members 25 and 26. As shown in FIGS. 12 and 13, these gas sealing members 25 and 26 delimit a fuel gas flow passage 27 and an oxidizing gas flow passage 28 so as to seal them on either side of the electrode assembly 22.

Figure 2:
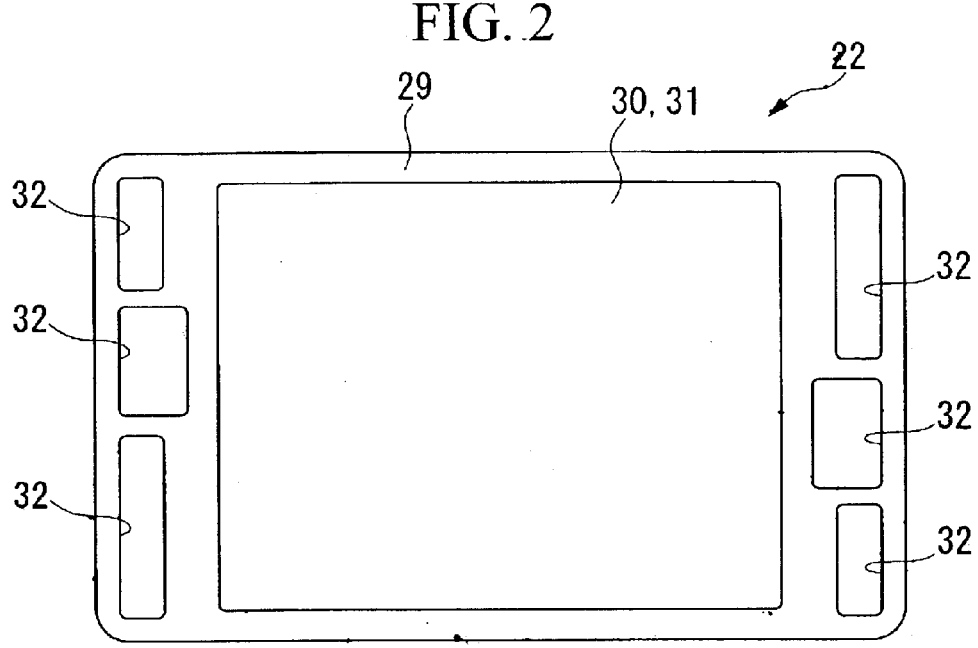
FIG. 2 is a plan view showing an electrode assembly forming the fuel cell unit shown in FIG. 1.

As shown in FIGS. 2 and 12, the electrode assembly 22 has, for example, a solid polymer electrolyte membrane 29

(hereinafter simply referred to as an electrolyte membrane) formed from a perfluorosulfonate polymer, and an anode electrode 30 and cathode electrode 31 that sandwich two surfaces of the electrolyte membrane 29.

As shown in FIG. 2, for example, the electrolyte membrane 29 has a plurality of through holes 32. The electrolyte membrane 29 is the equivalent size to the separators 23 and 24 that are described below, and each of the through holes 32 is placed at a position that corresponds to the respective supply ports 33 to 35 and the respective discharge ports 36 to 38 of the separators 23 and 24.

The anode electrode 30 and the cathode electrode 31 are constructed, for example, by stacking catalyst layers, formed from an alloy having Pt (platinum) as the main constituent, on a surface of a gas diffusion layer formed from porous carbon cloth or porous carbon paper that contacts the electrolyte membrane 29.

Figure 3:
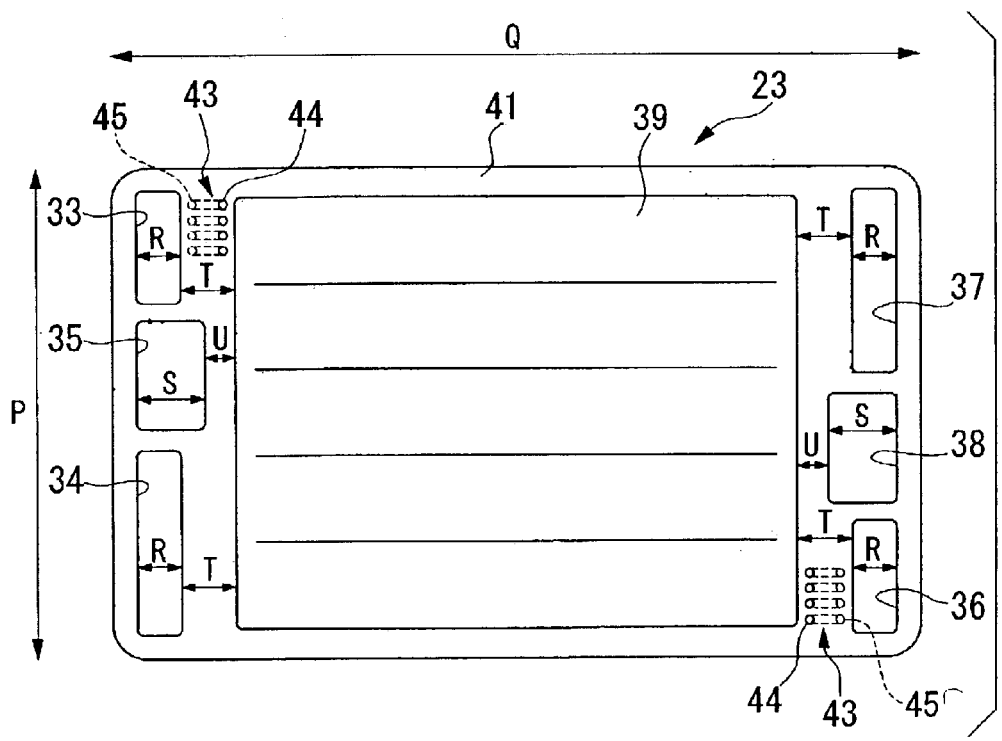
FIG. 3 is a plan view showing a separator adjacent to one electrode forming the fuel cell unit shown in FIG. 1.
Figure 4:
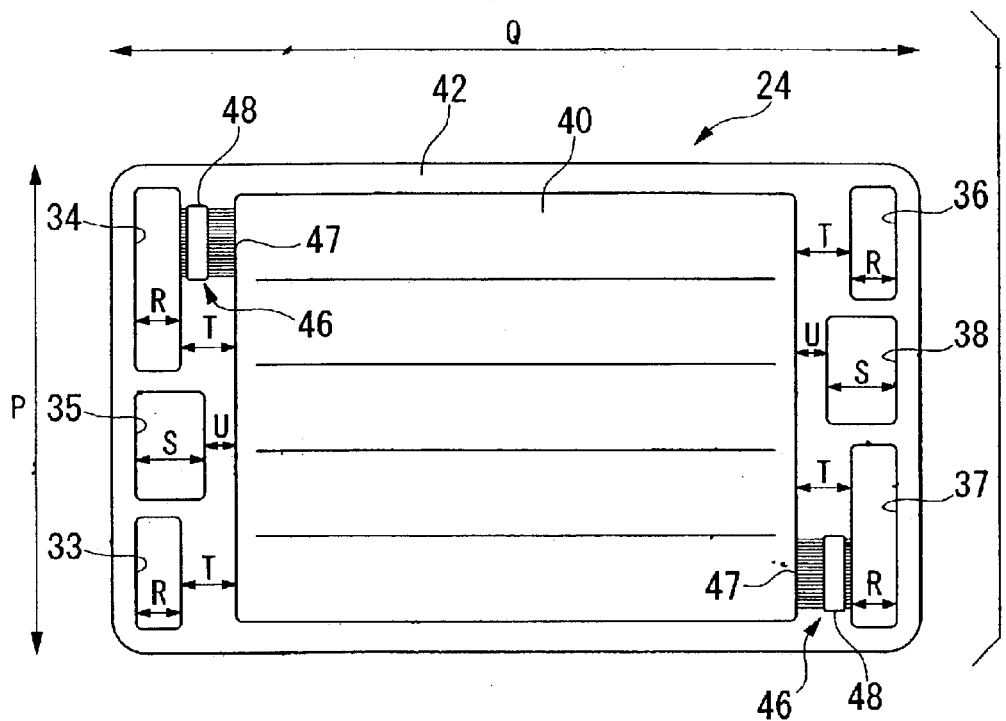
FIG. 4 is a plan view showing a separator adjacent to the other electrode forming the fuel cell unit shown in FIG. 1.

The fuel cell unit 21 includes two types of separators 23 and 24. As shown in FIGS. 3 and 4, each of the separators 23 and 24 is formed from: corrugated portions 39 and 40 made up of a plurality of indentations and bumps that have a fixed height and are formed in a fixed pattern by scraping out a plurality of grooves (not shown) in a surface of a flat plate made from carbon; a fuel gas supply port (reaction gas communication port) 33, an oxidizing gas supply port (reaction gas communication port) 34, a cooling medium supply port (cooling medium communication port) 35, a fuel gas discharge port (reaction gas communication port) 36, an oxidizing gas discharge port (reaction gas communication port) 37, and a cooling medium discharge port (cooling medium communication port) 38 that each penetrate the two separators 23 and 24 so as to make possible both the supply and discharge of fuel gas (for example, hydrogen gas), oxidizing gas (for example, air that contains oxygen), and a cooling medium (for example, pure water) respectively that are made to flow through the corrugated portions 39 and 40; and planar portions 41 and 42 that are disposed so as to surround each of the supply ports 33 to 35, the discharge ports 36 to 38, and the corrugated portions 39 and 40.

As shown in FIGS. 3 and 4, the cooling medium supply port 35 and the cooling medium discharge port 38 are located substantially in the center in the transverse direction of the separators 23 and 24 (i.e., the direction indicated by the arrow P). The fuel gas supply port 33 and the oxidizing gas supply port 34 are located at both sides in the transverse direction of the separators 23 and 24 (i.e., the direction indicated by the arrow P) sandwiching the cooling medium supply port 35. Furthermore, the fuel gas discharge port 36 and the oxidizing gas discharge port 37 are located at both sides in the transverse direction of the separators 23 and 24 (i.e., the direction indicated by the arrow P) sandwiching the cooling medium discharge port 38. The fuel gas discharge port 36 and the oxidizing gas discharge port 37 are located at diagonally opposite positions respectively to the fuel gas supply port 33 and the oxidizing gas supply port 34.

The lengths (as indicated by the arrow R) of the fuel gas supply port 33 and discharge port 36 and the lengths of the oxidizing gas supply port 34 and discharge port 37 in the longitudinal directions of the separators 23 and 24 (the direction indicated by the arrow Q) are made to be shorter than the lengths (as indicated by the arrow S) of the adjacent cooling medium supply port 35 and discharge port 38. As a result, the size of the space (as indicated by the arrow T) from the fuel gas supply port 33 and discharge port 36 and from the oxidizing gas supply port 34 and discharge port 37 to the corrugated portions 39 and 40 is made larger than the size of the space (as indicated by the arrow U) from the cooling medium supply port 35 and discharge port 38 to the corrugated portions 39 and 40.

One ends 44 of through paths 43 open in one surface (the surface facing the fuel gas) of the separator 23 for one electrode out of the pair of separators 23 and 24, as shown in FIG. 3. These through paths 43 are formed so as to penetrate the separator 23 in the thickness direction thereof and so as to connect the fuel gas supply port 33 with the corrugated portion 39, and to connect the corrugated portion 39 with the fuel gas discharge port 36, respectively.

On the other hand, as shown in FIG. 4, in one surface (the surface facing the oxidizing gas) of the other separator 24 for the other electrode, there are provided oxidizing gas communication paths 46 between the oxidizing gas supply port 34 and the corrugated portion 40, and between the corrugated portion 40 and the oxidizing gas discharge port 37, respectively, which allow the oxidizing gas supplied from the oxidizing gas supply port 34 to flow through the corrugated portion 40, and which allow the oxidizing gas that has passed through the corrugated portion 40 to be discharged from the oxidizing gas discharge port 37. Each of the oxidizing gas communication paths 46 comprises a plurality of grooves 47 that are formed on one surface of the separator 24, and a planar bridge plate 48 that extends right across the grooves 47. On the surface of the separator 24 where the bridge plate 48 is placed is formed a recess 49 into which the bridge plate 48 is fitted. This recess 49 enables the surface of the bridge plate 48 to be placed within the same planar surface as the surface 42 of the separator 24.

Figure 5:
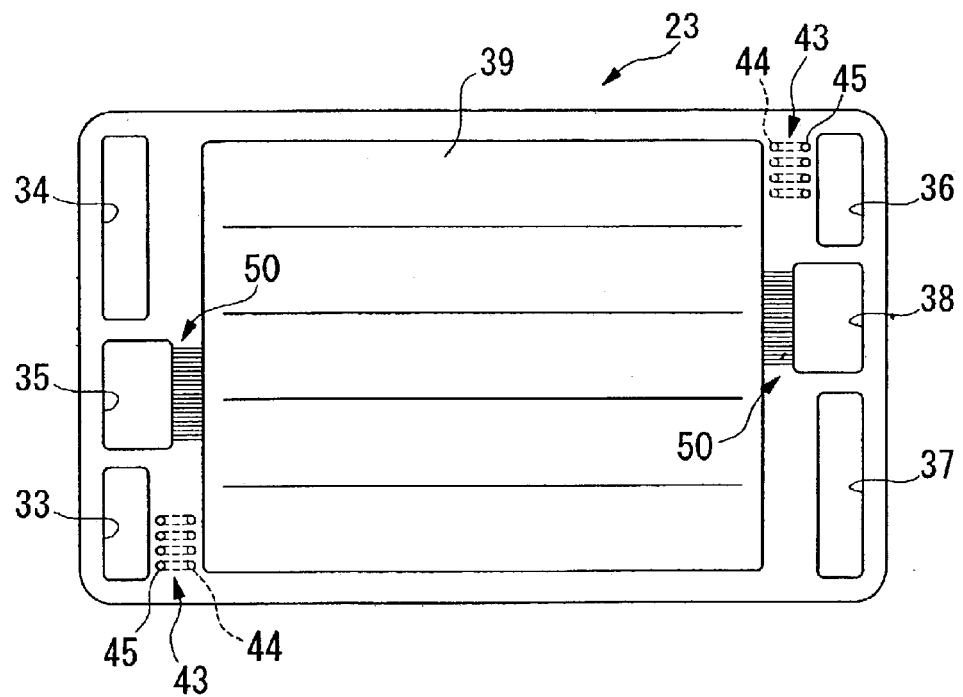
FIG. 5 is a plan view showing the rear surface of the separator shown in FIG. 3.
Figure 6:
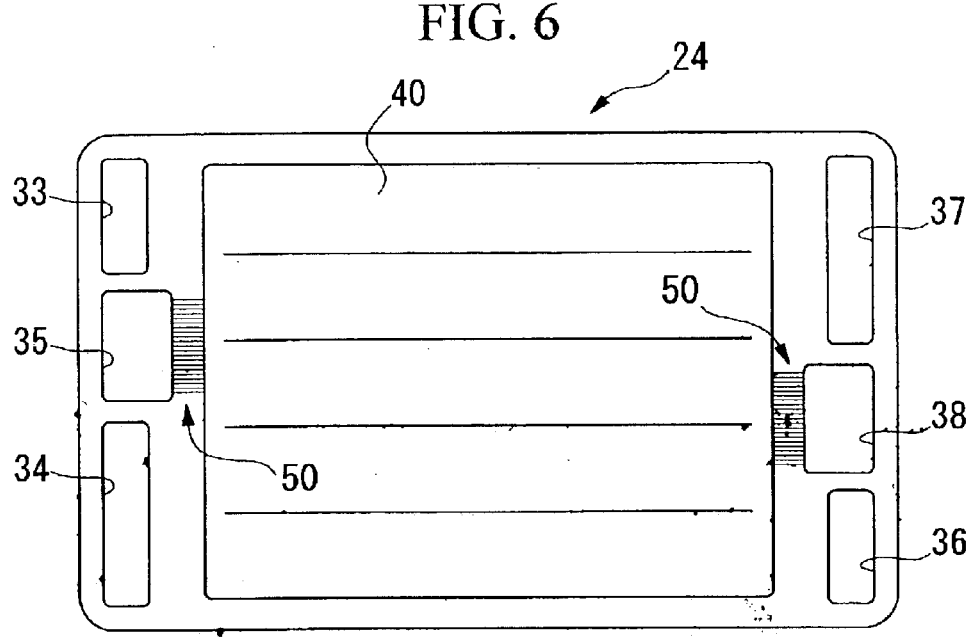
FIG. 6 is a plan view showing the rear surface of the separator shown in FIG. 4.

In the other surfaces (the surfaces facing the cooling medium) of the separators 23 and 24, there are provided cooling medium communication paths 50 that connect the cooling medium supply port 35 with the corrugated portions 39 and 40, and there are provided cooling medium communication paths 50 that connect the corrugated portions 39 and 40 with the cooling medium discharge port 38, as shown in FIG. 5 or FIG. 6. Moreover, as shown in FIG. 5, the other ends 45 of the through paths 43 open in the other surface of the separator 23 for the one electrode. Furthermore, as shown in FIGS. 3 and 5, the one ends 44 of the through paths 43 are located toward the corrugated portion 39, and the other ends 45 of the through paths 43 are located toward the fuel gas supply port 33 or fuel gas discharge port 36. Note that the surface of the separator 24, shown in FIG. 6, for the other electrode is constructed in the same way as the other surface of the separator 23 shown in FIG. 5 except that the through paths 43 are not formed therein.

Figure 7:
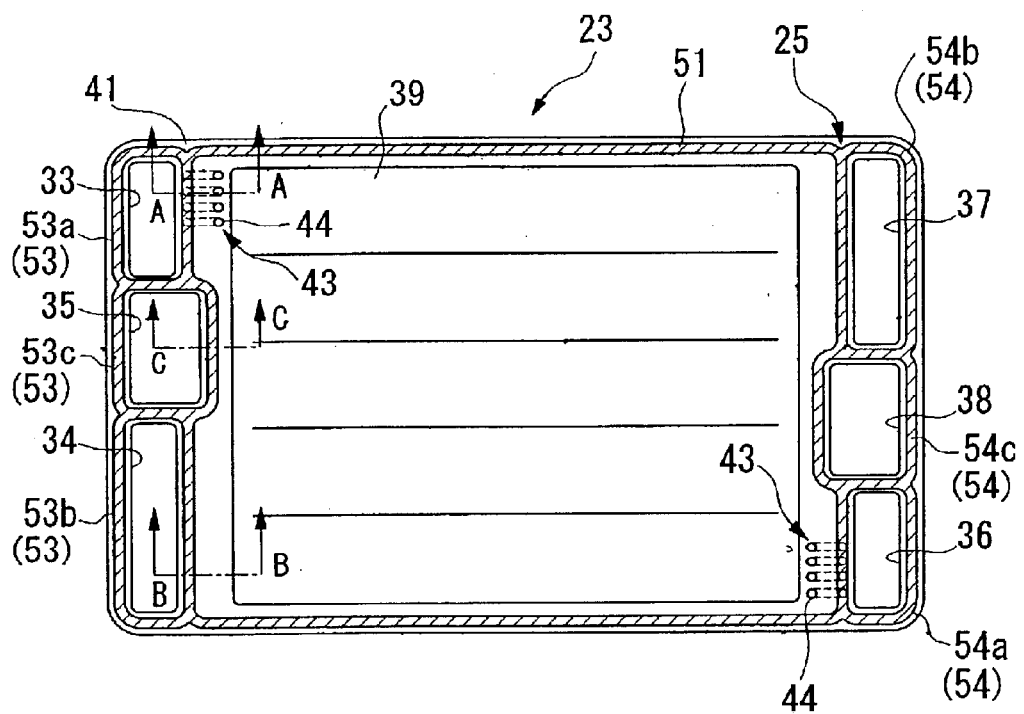
FIG. 7 is a plan view showing a state in which the gas sealing member is provided on the separator shown in FIG. 3.
Figure 9:
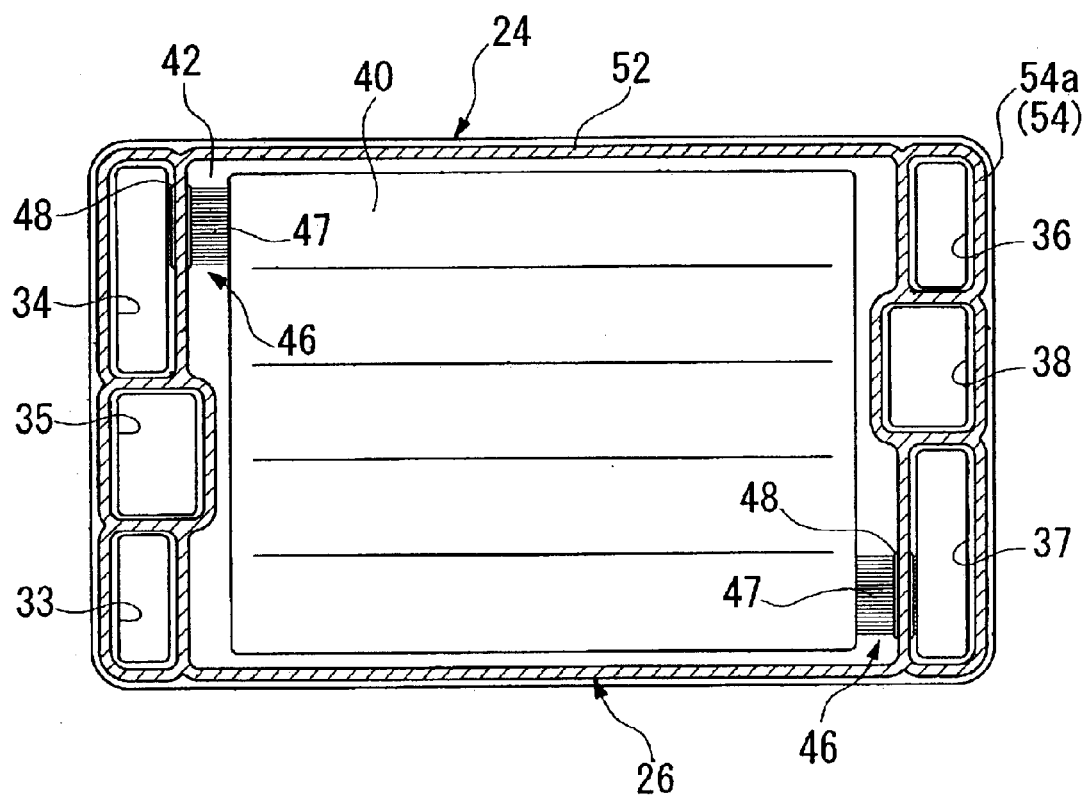
FIG. 9 is a plan view showing a state in which the gas sealing member is provided on the separator shown in FIG. 4.

As shown in FIGS. 7 and 9, the gas sealing members 25 and 26 that respectively seal the reaction gas flow passages are integrally formed such that a plurality of sub-loop portions 53 (53a to 53c) that encircle each of the supply ports 33 to 35 and discharge ports 36 to 38 are disposed on both sides of main-loop portions 51 and 52 that encircle the outer peripheries of the corrugated portions 39 and 40.

FIGS. 7 and 9 respectively show a state in which the gas sealing member 25 is provided on the anode electrode surface of the separator 23, and a state in which the gas sealing member 26 is provided on the cathode electrode surface of the separator 24.

According to FIGS. 7 and 9, the main-loop portions 51 and 52 of the gas sealing members 25 and 26 are positioned so as to run along the planar portions 41 and 42 between the respective supply ports 33 to 35 and the corrugated portions 39 and 40, and between the respective discharge ports 36 to 38 and the corrugated portions 39 and 40.

The portions of the main-loop portion 51 of the gas sealing member 25 that seals the fuel gas supply port 33 or fuel gas discharge port 36 are positioned so as to be offset from the one ends 44 of the through paths 43 toward the fuel gas supply port 33 or fuel gas discharge port 36 so that the one ends 44 of the through paths 43 are not covered by the gas sealing member 25. The gas sealing member 25 is bonded to the separator so as to be integrated therewith.

On the other hand, the main-loop portion 52 of the gas sealing member 26 is positioned so as to run on the bridge plates 48 provided in the communication paths 46 so that, between the supply ports 33 to 35 and the corrugated portion 40, and between the discharge ports 36 to 38 and the corrugated portion 40, fluid flow is allowed only through the grooves 47 formed in the communication paths 43, and the other portions are sealed in a fluid tight state.

Figure 8:
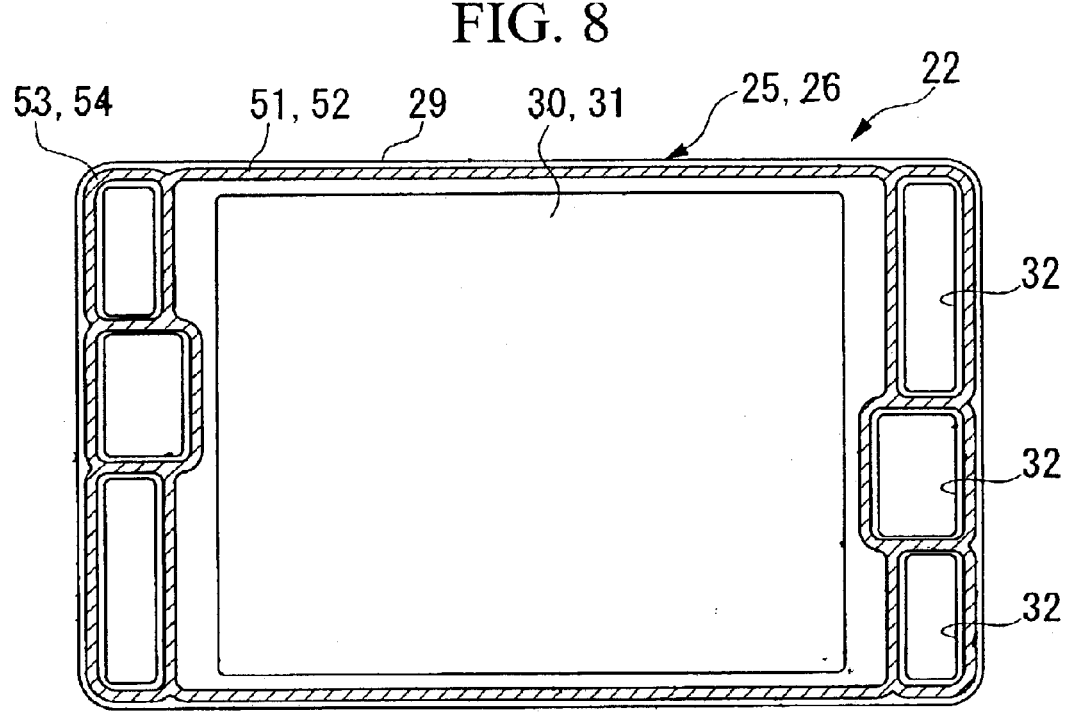
FIG. 8 is a plan view showing a state in which the gas sealing member is provided on the electrode assembly shown in FIG. 2.

FIG. 8 shows a state in which the gas sealing members 25 and 26 are provided on the electrode assembly 22. As shown in FIG. 8, the gas sealing members 25 and 26 are provided on the solid polymer electrolyte membrane 29. The gas sealing member 26 is integrated with the solid polymer electrolyte membrane 29.

As shown in FIG. 12, a plurality of fuel cell units 21 thus formed are stacked with respect to each other while sandwiching cooling surface sealing members 55 therebetween. As shown in FIGS. 10 and 11, the cooling surface sealing member 55 is formed by integrally connecting main-loop portion 57 and sub-loop portions 58.

The main-loop portion 57 of the cooling surface sealing member 55 runs between the supply ports 33 and 34 of the fuel gas and oxidizing gas and the corrugated portions 39 or 40, and also between the discharge ports 36 and 37 and the corrugated portions 39 and 40, and seals the periphery of the cooling medium flow passage 61 that is formed by connecting the cooling medium supply port 35 to the corrugated portions 39 and 40 via the communication paths 50, and by connecting the corrugated portions 39 and 40 to the cooling medium discharge port 38 via the communication paths 50. Moreover, the sub-loop portions 58 of the cooling surface sealing member 55 independently seal each of the fuel gas and oxidizing gas supply ports 33 and 34 and discharge ports 36 and 37.

As shown in FIG. 10, the portions of the main-loop portion 57 of the cooling surface sealing member 55 that seals the peripheries of the fuel gas supply port 33 or fuel gas discharge port 36 are positioned so as to be offset from the other ends 45 of the through paths 43 toward the corrugated portion 39 so that the other ends 44 of the through paths 43 are not covered by the cooling surface sealing member 55. As a result, the fuel gas that is supplied from the fuel gas supply port 33 and is discharged through the fuel gas discharge port 36 flows through the other ends 45 of the through paths 43 without flowing through the corrugated portion 39 on the cooling surface. As mentioned above, because the one ends 44 of the through paths 43 are not covered by the gas sealing member 25, it is possible to supply or discharge the fuel gas via the one ends 44.

A cross section of a portion of the fuel cell stack 20 that is constructed in this manner is shown in FIG. 12. FIG. 12 is a longitudinal cross-sectional view, showing the fuel cell stack 20 shown in FIG. 1, taken along the line A—A in FIG. 7. In FIG. 12, there is shown a flow passage that allows the fuel gas to flow into the fuel gas flow passage 27. Moreover, the gas sealing members 25 and 26 that each seal the space between the electrode assembly 22 and the separator 23 and the space between the electrode assembly 22 and the separator 24 are disposed so as to sandwich the electrolyte membrane 29 in the thickness direction thereof at positions corresponding to each other as viewed in the stacking direction. As can be seen in FIG. 12, the fuel gas that is supplied from the fuel gas supply port 33 on the exterior side of the main-loop portion 51 of the gas sealing member 25 is allowed to flow into the fuel gas flow passage 27 on the interior side of the main-loop portion 51 of the gas sealing member 25 via the through paths 43 that penetrate the separator 23 in the thickness direction thereof. Because the reaction gas communication paths that detour around the gas sealing member 25 in the thickness direction need not be formed in the separator 23, and because the bridge plate is not necessary, it is possible to ensure the flatness of the portion where the gas sealing member 25 is disposed. Accordingly, the sealing performance of the gas sealing member 25 can be improved because the gas sealing member 25 can be reliably bonded to a predetermined portion of the separator 23 so as to be integrated therewith while preventing the deformation of the gas sealing member 25 when it is integrally formed on the separator 23.

Although, the above description is for the fuel gas supply port 33, the same description also applies in the case of the fuel gas discharge port 36.

FIG. 13 is a longitudinal cross-sectional view, showing the fuel cell stack 20 shown in FIG. 1, taken along the line B—B in FIG. 7. As can be seen in FIG. 13 as well, the gas sealing members 25 and 26 that each seal the space between the electrode assembly 22 and the separator 23 and the space between the electrode assembly 22 and the separator 24 are disposed so as to sandwich the electrolyte membrane 29 in the thickness direction thereof at positions corresponding to each other as viewed in the stacking direction. The oxidizing gas communication paths 46 As can be seen in FIG. 12, the fuel gas that is supplied from the fuel gas supply port 33 on the exterior side of the main-loop portion 51 of the gas sealing member 25 is allowed to flow into the fuel gas flow passage 27 on the interior side of the main-loop portion 51 of the gas sealing member 25 via the through paths 43 that penetrate the separator 23 in the thickness direction thereof. The oxidizing gas communication paths 46 detour around the main-loop portion 52 of the gas sealing member 26 in the thickness direction of the separator 24, and connect the interior of the main-loop portion 52 of the gas sealing member 26 with the exterior thereof so as to allow the oxidizing gas that is supplied from the oxidizing gas supply port 34 on the exterior side of the main-loop portion 52 of the gas sealing member 26 to flow into the oxidizing gas flow passage 28 on the interior side of the main-loop portion 52 of the gas sealing member 26. As a result, the oxidizing gas need not flow on the rear surface (cooling surface) of the separator 24, and the cooling surface sealing member 55 need not be provided so as to overlap with the oxidizing gas flow passage 28 as viewed in the stacking direction.

Although, the above description is for the oxidizing gas supply port 34, the same description also applies in the case of the oxidizing gas discharge port 37.

Figure 14:
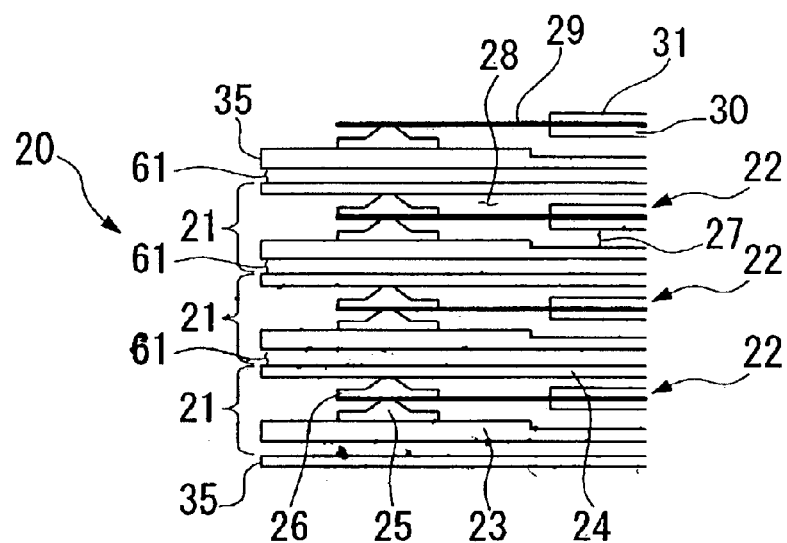
FIG. 14 is a longitudinal cross-sectional view, showing the fuel cell stack shown in FIG. 1, taken along the line C—C in FIG. 7.

FIG. 14 is a longitudinal cross-sectional view, showing the fuel cell stack 20 shown in FIG. 1, taken along the line C—C in FIG. 7. In FIG. 14, there is shown a flow passage that connects the cooling medium supply port 35 with the cooling medium flow passage 61 that is delimited between adjacent fuel cell units 21.

As explained above, in the present embodiment, because the gas sealing member 25 can be reliably bonded to a predetermined portion of the separator 23 that does not include the communication paths so as to be integrated therewith while preventing the deformation of the gas sealing member 25 when it is formed, the sealing performance of the gas sealing member 25 can be improved. Moreover, because the-reaction gases (fuel gas and oxidizing gas) need not flow through the rear surface (cooling surface) of the separator 24 for the other electrode, the cooling surface sealing member 55 need not be provided so as to overlap with the oxidizing gas flow passage 28 as viewed in the stacking direction. Therefore, the dimensions of the fuel cell unit 21 in the stacking direction can be reduced by the amount saved in this way, and consequently the dimensions in the stacking direction of the fuel cell stack 20 that is formed by stacking the fuel cell units 21 can be greatly reduced.

Figure 15:
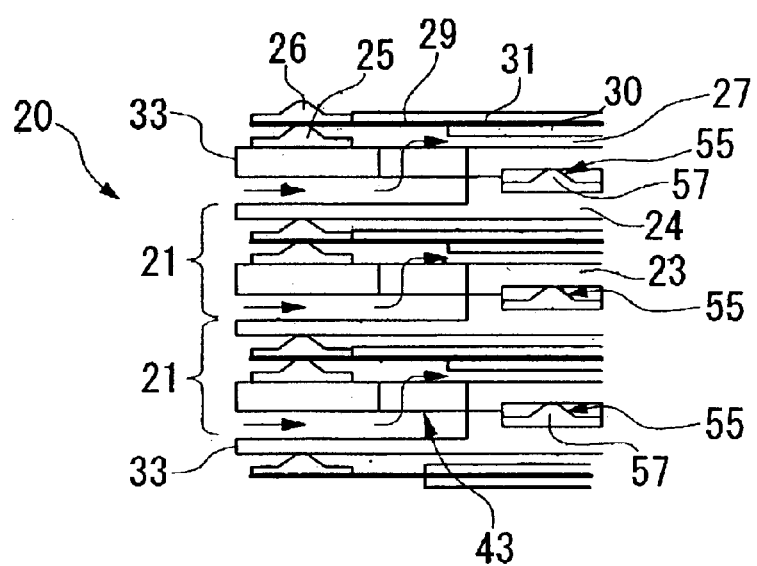
FIG. 15 is a longitudinal cross-sectional view showing a second embodiment of the present invention, corresponding to FIG. 12 showing the first embodiment.
Figure 16:
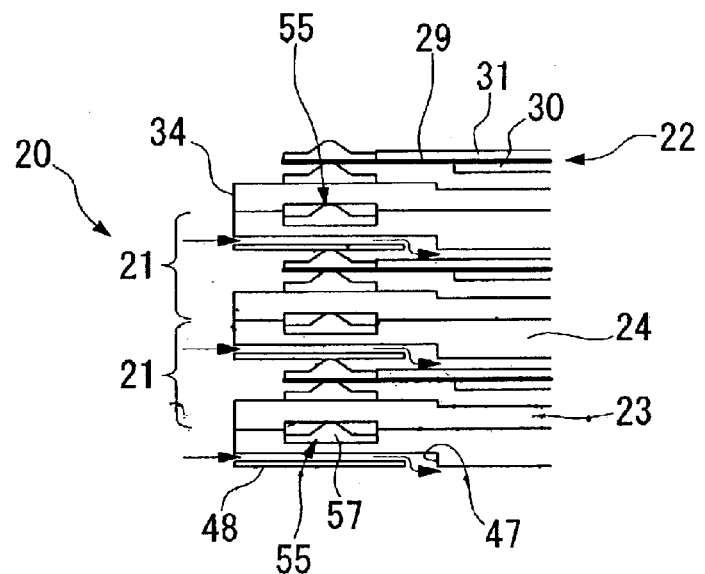
FIG. 16 is a longitudinal cross-sectional view showing the second embodiment of the present invention, corresponding to FIG. 13 showing the first embodiment.

Next, FIGS. 15 and 16 show the second embodiment of the present invention, respectively corresponding to FIGS. 12 and 13 showing the first embodiment. For the elements in the following embodiments which are common in the previous embodiment, the same reference symbols will be applied, and explanations thereof will be omitted as appropriate.

In the second embodiment, the planar area of the cathode electrode 31 is made larger than that of the anode electrode 30 so that one peripheral edge of the gas sealing member 26 that is bonded to the electrolyte membrane 29 so as to be integrated therewith contacts the cathode electrode 31. Accordingly, because the surface of the electrolyte membrane 29 to which the gas sealing member 26 is bonded is reinforced in the thickness direction by the cathode electrode 31, the reliability of the fuel cell stack 20 can be improved. Furthermore, because the entire surface of the electrolyte membrane 29 facing the oxidizing gas is covered with the cathode electrode 31, and thus the electrolyte membrane 29 is not exposed to the oxidizing gas at all, the electrolyte membrane 29 is reinforced over the entire surface thereof, and consequently, the durability of the electrolyte membrane 29 can be further improved. As in the first embodiment, in this embodiment as well, it is possible to reduce the dimensions of the fuel cell stack 20 in the stacking direction while ensuring the sealing performance of the gas sealing member 25. Note that the planar area of the cathode electrode 31 is made larger than that of the anode electrode 30 in this embodiment; however, the planar area of the anode electrode 30 may be made larger than that of the cathode electrode 31, instead.

Figure 17:
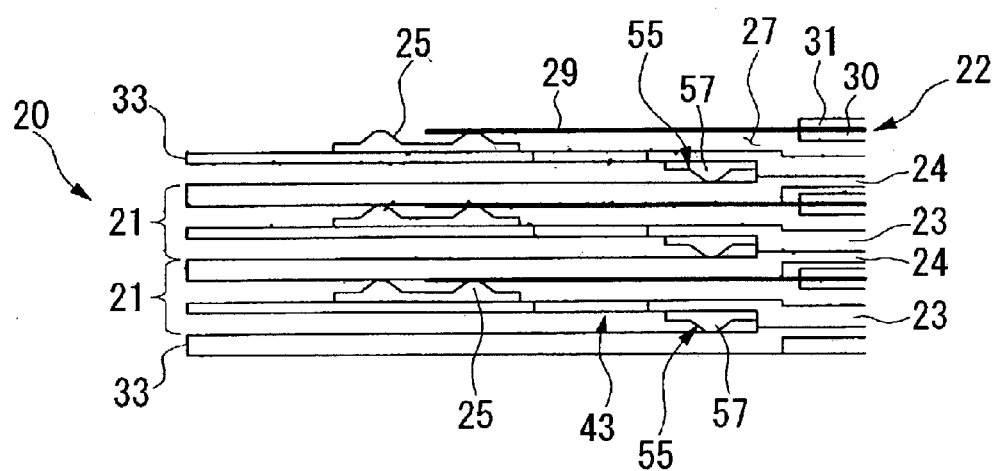
FIG. 17 is a longitudinal cross-sectional view showing a third embodiment of the present invention, corresponding to FIG. 12 showing the first embodiment.
Figure 18:
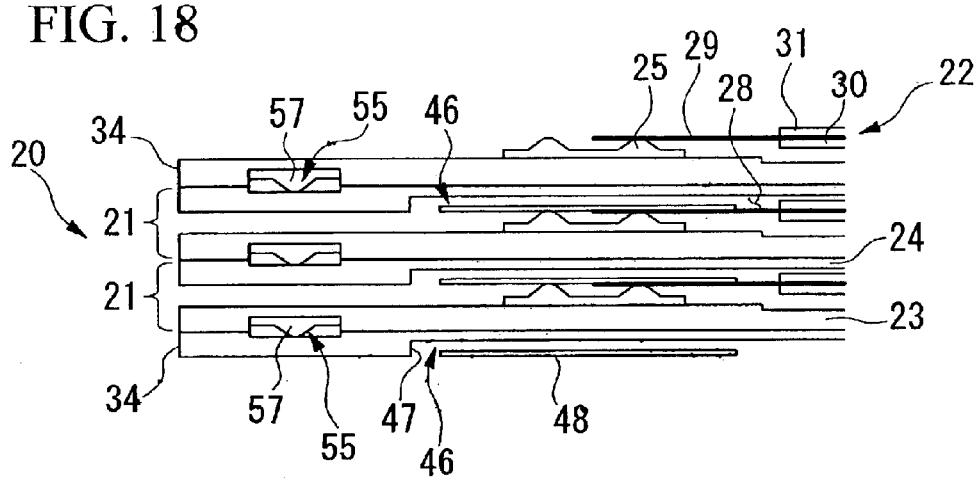
FIG. 18 is a longitudinal cross-sectional view showing the third embodiment of the present invention, corresponding to FIG. 13 showing the first embodiment.

Next, FIGS. 17 and 18 show the third embodiment of the present invention, respectively corresponding to FIGS. 12 and 13 showing the first embodiment. In the third embodiment, the gas sealing member 25 is provided as a double sealing structure. That is, the gas sealing member 25 is bonded to the separator 23 for the one electrode so as to be integrated therewith, and the gas sealing member 25 is pressed against the electrolyte membrane 29 of the electrode assembly 22 as well as against the separator 24 for the other electrode. Accordingly, because the gas sealing member 25 is pressed against the electrolyte membrane 29, flowing out of the fuel gas from the space delimited by the electrode assembly 22 can be prevented, and at the same time, because the gas sealing member 25 is pressed against the separator 24 for the other electrode, flowing out of the fuel gas to the outside can be reliably prevented. As in the first embodiment, in this embodiment as well, it is possible to improve the sealing performance by ensuring the sealing function of the gas sealing member 25. In addition, because the gas sealing member 25 is provided only on the separator 23 for the one electrode so as to be integrated therewith, the gas sealing member 25 can be formed in one process, and need not be formed on the other separator 24, which simplifies the manufacturing process. Moreover, as shown in FIG. 18, because the main-loop portion 57 of the cooling surface sealing member 55 is positioned so as to be offset from the main-loop portion 51 of the gas sealing member 25 in the vicinity of the oxidizing gas supply port 34 (as well as in the vicinity of the oxidizing gas discharge port 37), the thickness of each of the fuel cell units 21 in the stacking direction can be reduced by the amount saved in this way, and consequently the thickness of the fuel cell stack 20 can be greatly reduced. Note that the sealing structure is not limited to a double sealing structure, and a multiple sealing structure formed by three or more seals may be employed. Because the main-loop portion 57 of the cooling surface sealing member 55 is disposed toward outside, the dimensions of the fuel cell stack 20 in the stacking direction can be further reduced.

Figure 19:
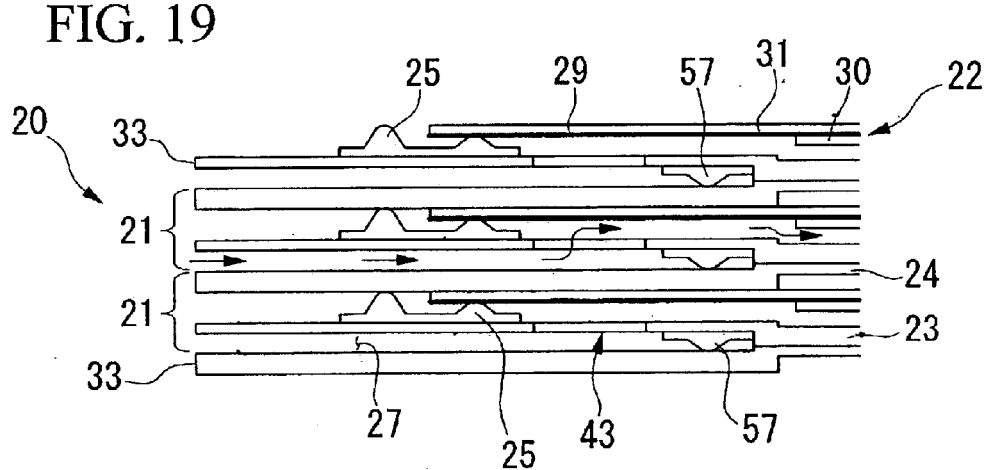
FIG. 19 is a longitudinal cross-sectional view showing a fourth embodiment of the present invention, corresponding to FIG. 12 showing the first embodiment.
Figure 20:
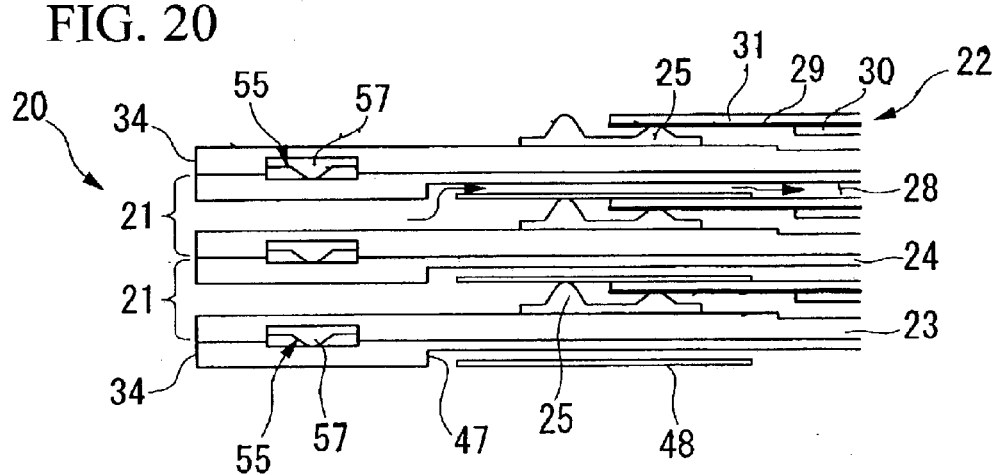
FIG. 20 is a longitudinal cross-sectional view showing the fourth embodiment of the present invention, corresponding to FIG. 13 showing the first embodiment.

Next, FIGS. 19 and 20 show the fourth embodiment of the present invention, respectively corresponding to FIGS. 12 and 13 showing the first embodiment. In the fourth embodiment, the cathode electrode 31 is made as large as the electrolyte membrane 29 that is made larger than the anode electrode 30, and merely the gas sealing member 25 that is bonded to the separator 23 for the one electrode so as to be integrated therewith is employed as a gas sealing member. The gas sealing member 25 is pressed against the electrolyte membrane 29 as well as against the separator 24 for the other electrode. In this embodiment, because the strength of the electrode assembly 22 in the thickness direction thereof can be increased by reinforcing the electrolyte membrane 29 using the cathode electrode 31, the gas sealing member 25 can be pressed against the electrolyte membrane 29 with more pressure, whereby the sealing performance can be further increased. Moreover, as in the first embodiment, in this embodiment as well, it is possible to reduce the dimensions of the fuel cell stack 20 in the stacking direction while improving the sealing performance by ensuring the sealing function of the gas sealing member 25. Furthermore, because the durability of the electrolyte membrane 29 can be improved as in the second embodiment, the reliability of the fuel cell stack 20 can also be improved.

Figure 21:
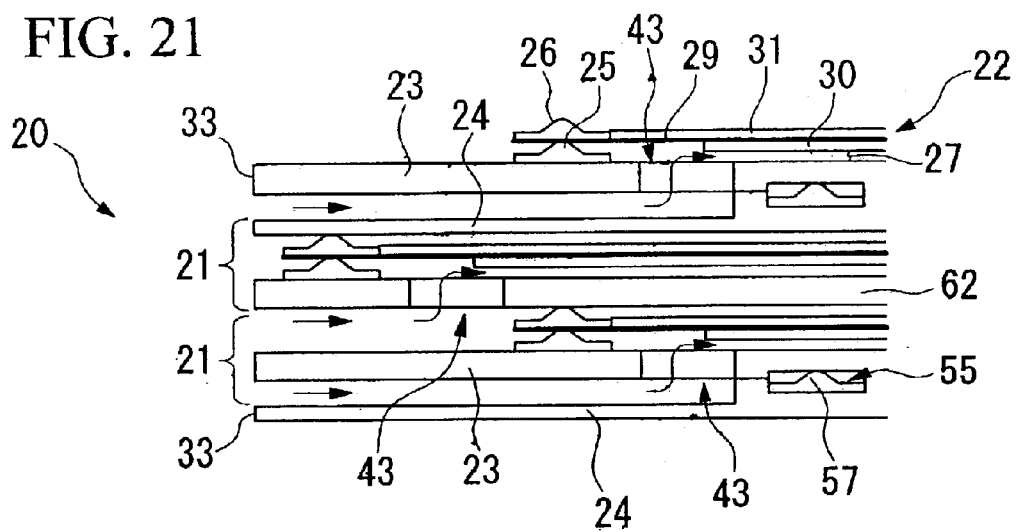
FIG. 21 is a longitudinal cross-sectional view showing a fifth embodiment of the present invention, corresponding to FIG. 12 showing the first embodiment.
Figure 22:
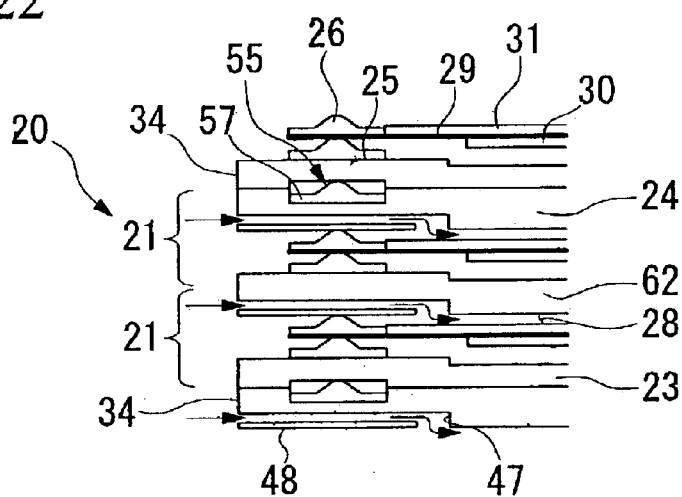
FIG. 22 is a longitudinal cross-sectional view showing the fifth embodiment of the present invention, corresponding to FIG. 13 showing the first embodiment.

Next, FIGS. 21 and 22 show the fifth embodiment of the present invention, respectively corresponding to FIGS. 12 and 13 showing the first embodiment. In the fourth embodiment, the cooling medium flow passage 61 is formed for every two fuel cell units 21, and cooling is performed on every two cells (i.e., two fuel cell units). The fuel cell stack 20 in this embodiment comprises a separator 62 that does not contribute to forming the cooling medium flow passage 61. As shown in FIG. 21, the through path 43 formed in the separator 62 is located so as to be offset, as viewed in the stacking direction, with respect to the through path 43 formed in the separator 23. Accordingly, because the number of elements for cooling such as the cooling surface sealing member 55 is reduced by the degree of reduction in the number of the cooling medium flow passages 61, the manufacturing process may be simplified. In addition, because the separator 62 need not be sufficiently thick to form the cooling medium flow passage 61 therein, the thickness of the fuel cell unit 21 can be reduced, and consequently the thickness of the fuel cell stack 20 can be reduced by the amount saved in this way. Furthermore, as in the first embodiment, in this embodiment as well, it is possible to reduce the dimensions of the fuel cell stack 20 in the stacking direction while improving the sealing performance by ensuring the sealing function of the gas sealing member 25. Note that, in this embodiment, a description is given of when cooling is performed for every two fuel cell units; however, the present invention is not limited to this and the fuel cell stack 20 may also be structured such that cooling is performed for every three or more fuel cell units 21.

Figure 23:
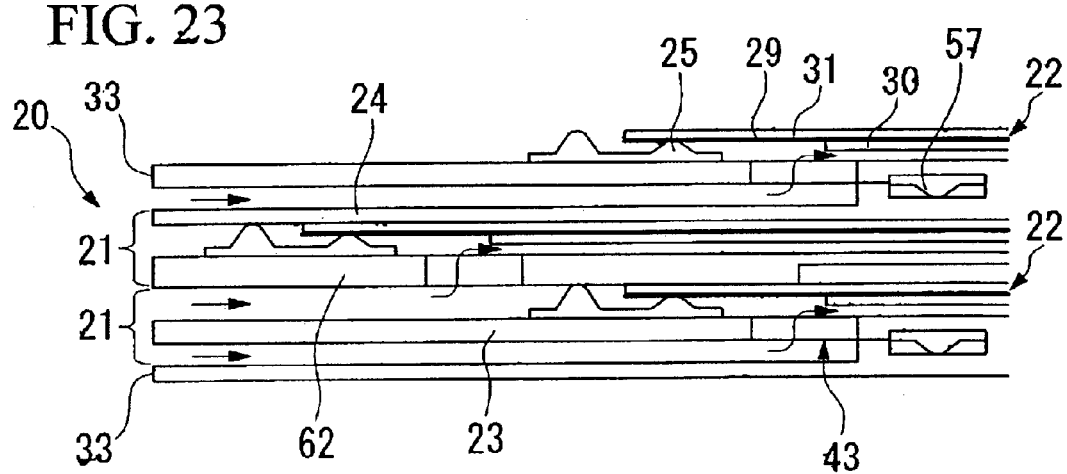
FIG. 23 is a longitudinal cross-sectional view showing a sixth embodiment of the present invention, corresponding to FIG. 12 showing the first embodiment.
Figure 24:
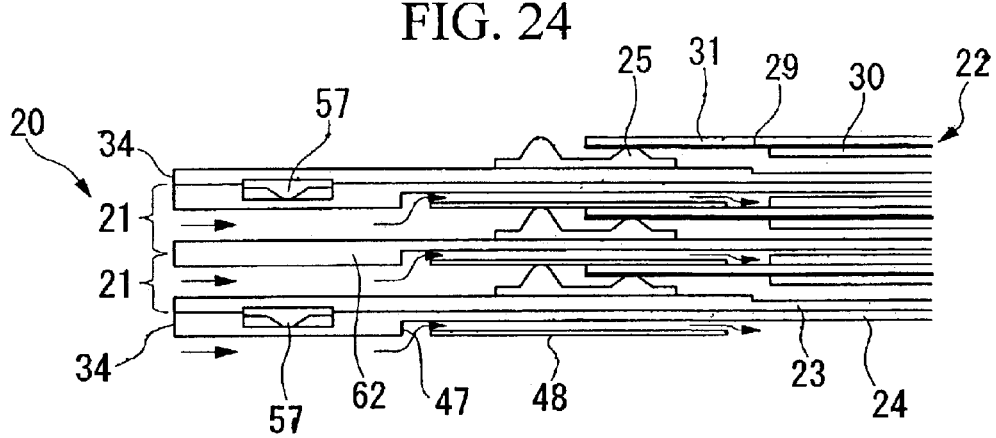
FIG. 24 is a longitudinal cross-sectional view-showing the sixth embodiment of the present invention, corresponding to FIG. 13 showing the first embodiment.

Next, FIGS. 23 and 24 show the sixth embodiment of the present invention, respectively corresponding to FIGS. 12 and 13 showing the first embodiment. In the sixth embodiment, cooling is performed on every two fuel cell units as in the fifth embodiment, and the cathode electrode 31 is made as large as the electrolyte membrane 29 as in the fourth embodiment, furthermore, the gas sealing member 25 is pressed against the electrolyte membrane 29 of the electrode assembly 22 as well as against the separator 24 for the other electrode. Accordingly, as in the fifth embodiment, the manufacturing process may be simplified. Moreover, as in the fourth embodiment, because the gas sealing member 25 can be pressed against the electrolyte membrane 29 with more pressure, the sealing performance can be further increased. Furthermore, as in the first embodiment, in this embodiment as well, it is possible to reduce the dimensions of the fuel cell stack 20 in the stacking direction while improving the sealing performance by ensuring the sealing function of the gas sealing member 25.

Figure 25:
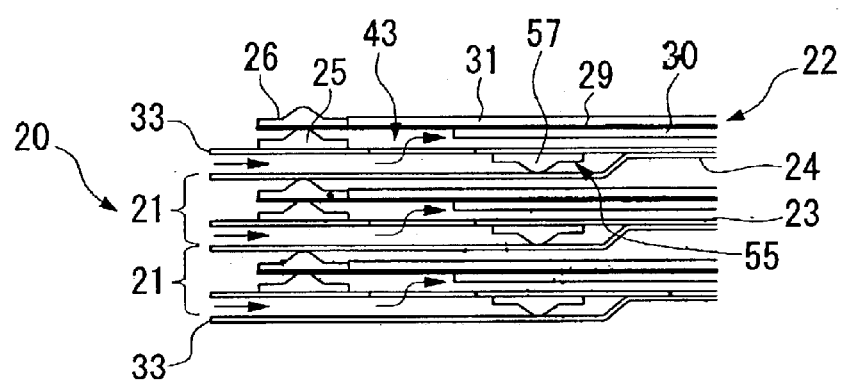
FIG. 25 is a longitudinal cross-sectional view showing a seventh embodiment of the present invention, corresponding to FIG. 12 showing the first embodiment.
Figure 26:
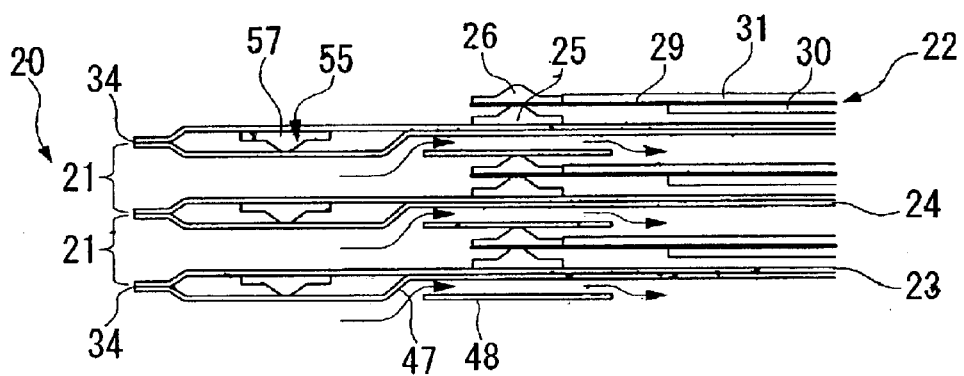
FIG. 26 is a longitudinal cross-sectional view showing the seventh embodiment of the present invention, corresponding to FIG. 13 showing the first embodiment.

Next, FIGS. 25 and 26 show the seventh embodiment of the present invention, respectively corresponding to FIGS. 12 and 13 showing the first embodiment. In the seventh embodiment, the separators 23 and 24 are provided with corrugated portions 39 and 40, supply ports 33 to 35, discharge ports 36 to 38, and planar sections 41 and 42, as shown in FIG. 1, by press forming a stainless steel plate with a plate thickness of approximately 0.1 to 0.5 mm. By using press formed separators 24 and 25, the thicknesses of the separators may be reduced, and also productivity can be improved. As in the second embodiment, because the planar area of the cathode electrode 31 is made larger than that of the anode electrode 30, the surface of the electrolyte membrane 29 to which the gas sealing member 26 is bonded is reinforced in the thickness direction by the cathode electrode 31; therefore, the reliability of the fuel cell stack 20 can be improved. Furthermore, as in the first embodiment, in this embodiment as well, it is possible to reduce the dimensions of the fuel cell stack 20 in the stacking direction while improving the sealing performance by ensuring the sealing function of the gas sealing member 25.

Figure 27:
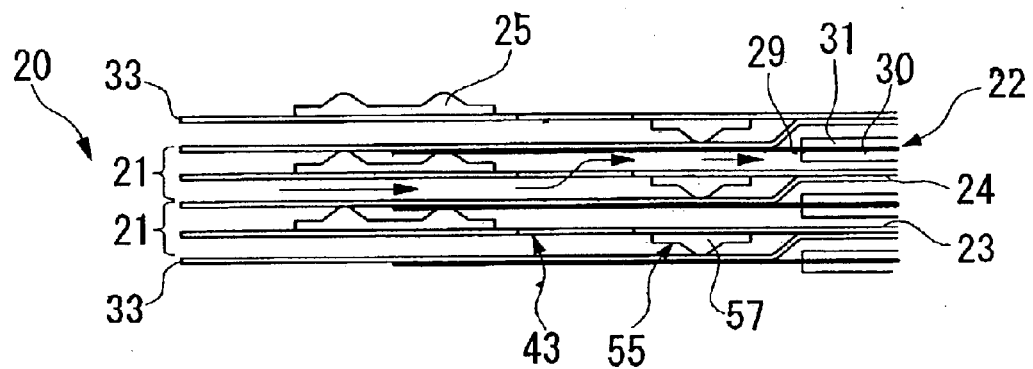
FIG. 27 is a longitudinal cross-sectional view showing an eighth embodiment of the present invention, corresponding to FIG. 12 showing the first embodiment.
Figure 28:
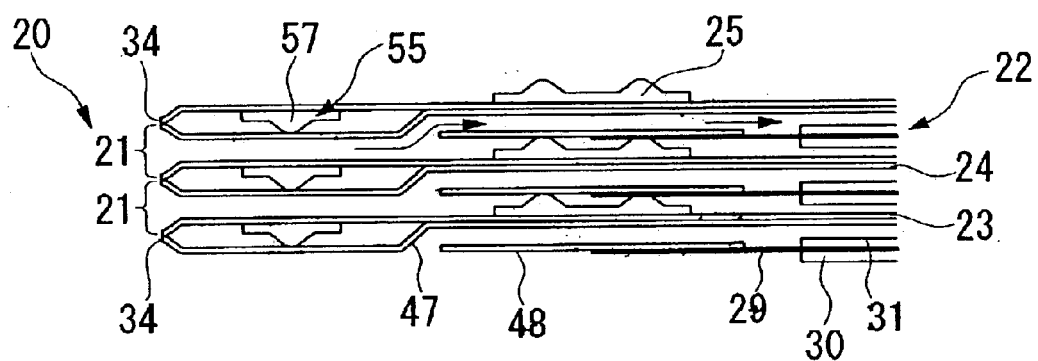
FIG. 28 is a longitudinal cross-sectional view showing the eighth embodiment of the present invention, corresponding to FIG. 13 showing the first embodiment.

Next, FIGS. 27 and 28 show the eighth embodiment of the present invention, respectively corresponding to FIGS. 12 and 13 showing the first embodiment. As in the seventh embodiment, in this embodiment as well, the separators 23 and 24 are made by press forming stainless steel plates. Moreover, as in the third embodiment, in this embodiment as well, because the gas sealing member 25 is pressed against the electrolyte membrane 29 of the electrode assembly 22 as well as against the separator 24 for the other electrode, flowing out of the reaction gases to the outside can be reliably prevented. Furthermore, as in the first embodiment, in this embodiment as well, it is possible to reduce the dimensions of the fuel cell stack 20 in the stacking direction while improving the sealing performance by ensuring the sealing function of the gas sealing member 25.

Figure 29:
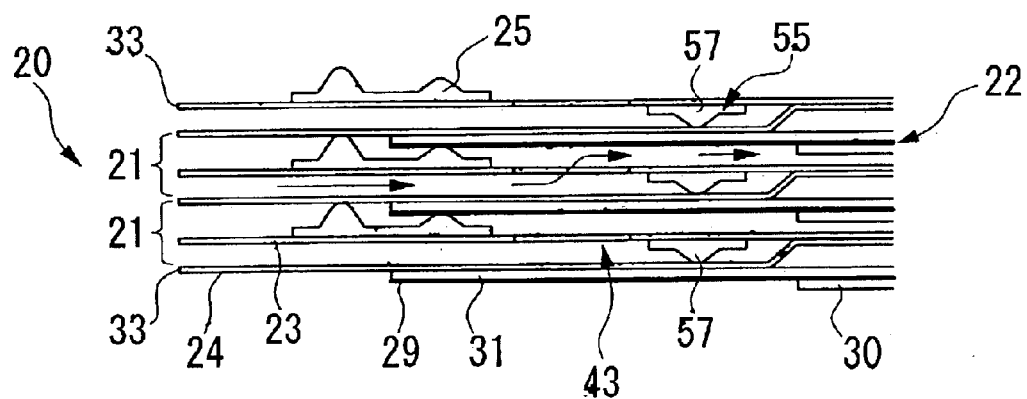
FIG. 29 is a longitudinal cross-sectional view showing a ninth embodiment of the present invention, corresponding to FIG. 12 showing the first embodiment.
Figure 30:
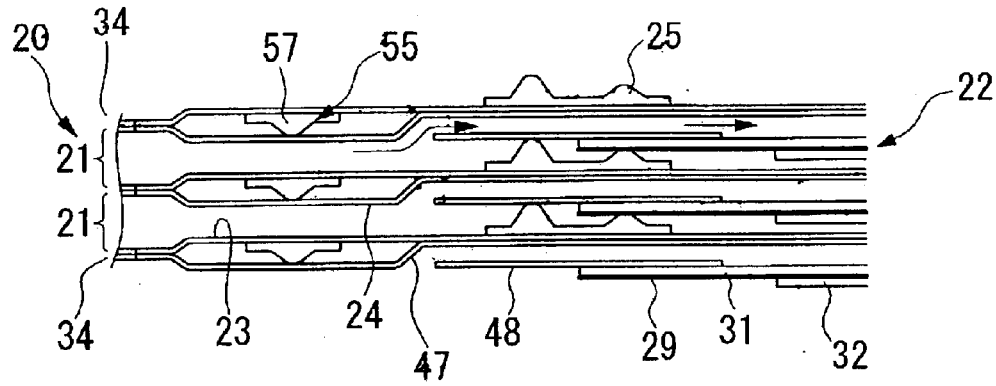
FIG. 30 is a longitudinal cross-sectional view showing the ninth embodiment of the present invention, corresponding to FIG. 13 showing the first embodiment.

Next, FIGS. 29 and 30 show the ninth embodiment of the present invention, respectively corresponding to FIGS. 12 and 13 showing the first embodiment. As in the seventh embodiment, in this embodiment as well, the separators 23 and 24 are made by press forming stainless steel plates. Moreover, as in the fourth embodiment, in this embodiment as well, the cathode electrode 31 is made as large as the electrolyte membrane 29, and the gas sealing member 25 is pressed against the electrolyte membrane 29 as well as against the separator 24 for the other electrode; therefore, the sealing performance can be increased. Furthermore, as in the first embodiment, in this embodiment as well, it is possible to reduce the dimensions of the fuel cell stack 20 in the stacking direction while improving the sealing performance by ensuring the sealing function of the gas sealing member 25.

Figure 31:
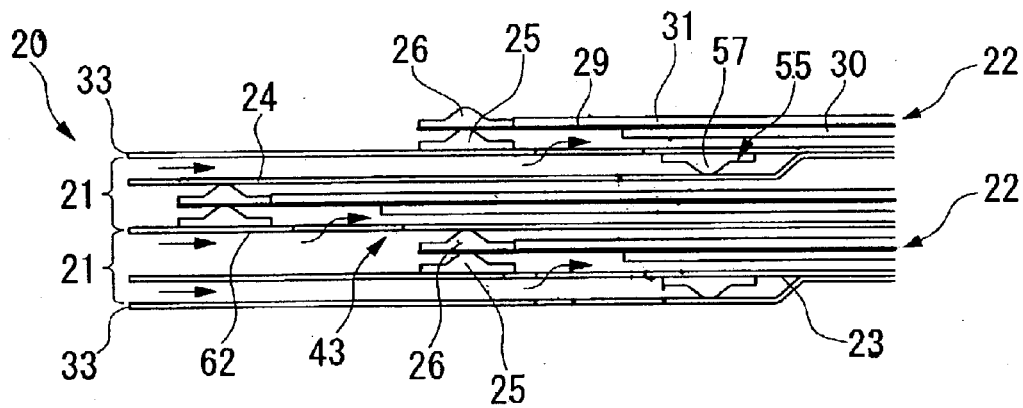
FIG. 31 is a longitudinal cross-sectional view showing a tenth embodiment of the present invention, corresponding to FIG. 12 showing the first embodiment.
Figure 32:
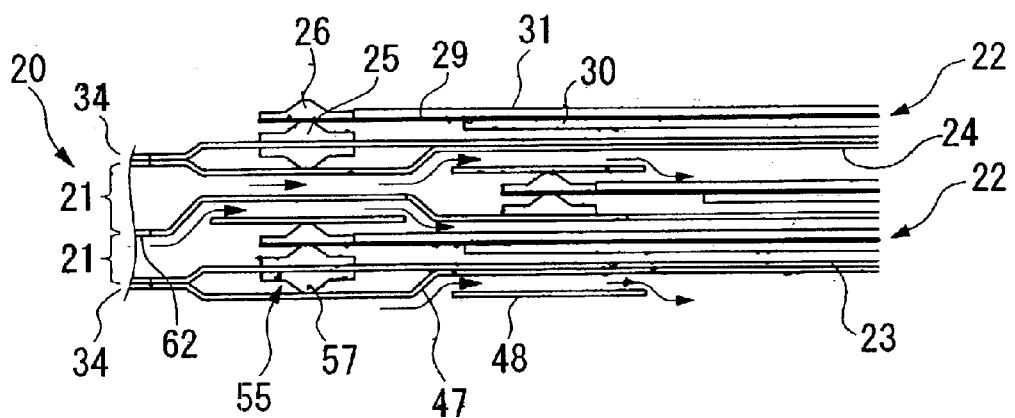
FIG. 32 is a longitudinal cross-sectional view showing the tenth embodiment of the present invention, corresponding to FIG. 13 showing the first embodiment.

Next, FIGS. 31 and 32 show the tenth embodiment of the present invention, respectively corresponding to FIGS. 12 and 13 showing the first embodiment. As in the seventh embodiment, in this embodiment as well, the separators 23 and 24 are made by press forming stainless steel plates. Moreover, because cooling is performed on every two fuel cell units, the manufacturing process may be simplified, and the dimensions of the fuel cell stack 20 in the stacking direction can be reduced. Furthermore, as in the first embodiment, in this embodiment as well, it is possible to reduce the dimensions of the fuel cell stack 20 in the stacking direction while improving the sealing performance by ensuring the sealing function of the gas sealing member 25.

Figure 33:
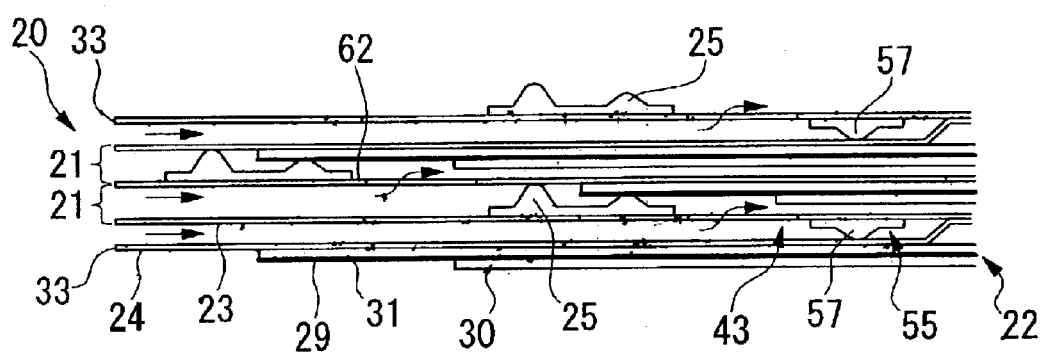
FIG. 33 is a longitudinal cross-sectional view showing an eleventh embodiment of the present invention, corresponding to FIG. 12 showing the first embodiment.
Figure 34:
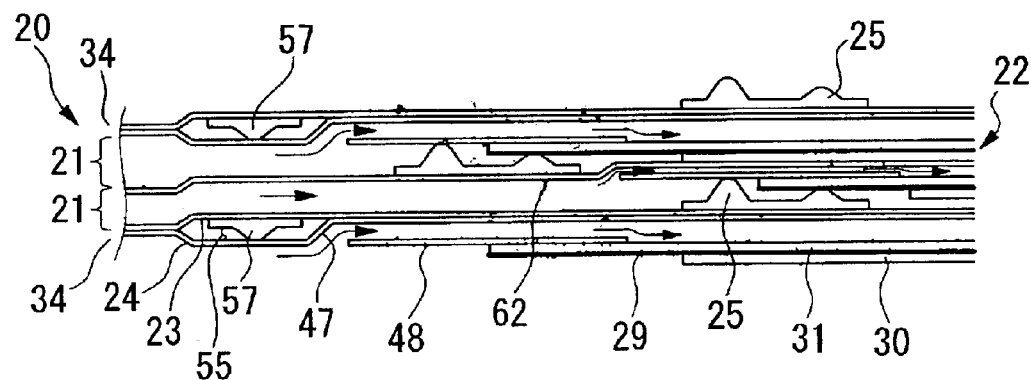
FIG. 34 is a longitudinal cross-sectional view showing the eleventh embodiment of the present invention, corresponding to FIG. 13 showing the first embodiment.
Figure 35:
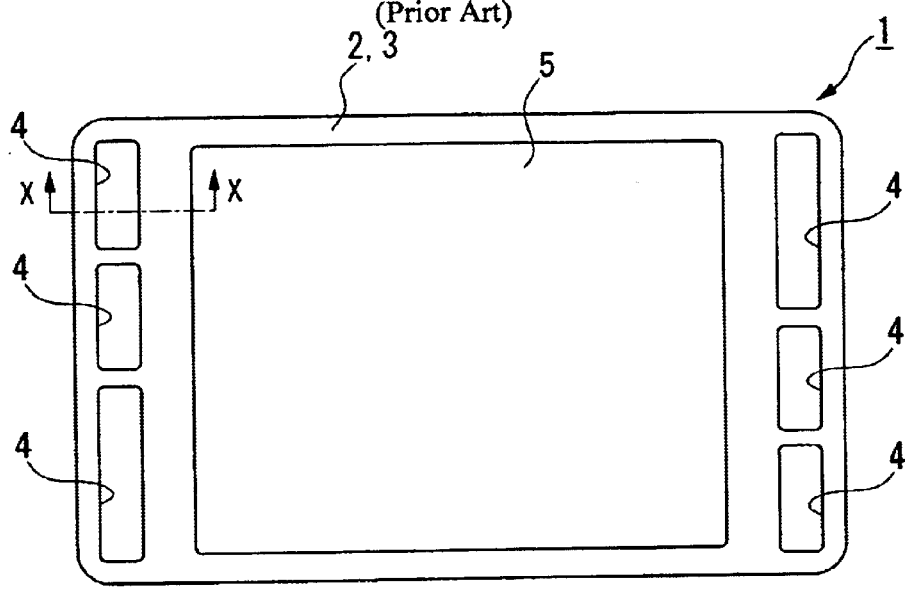
FIG. 35 is a plan view schematically showing a fuel cell unit in a conventional fuel cell stack.
Figure 36:
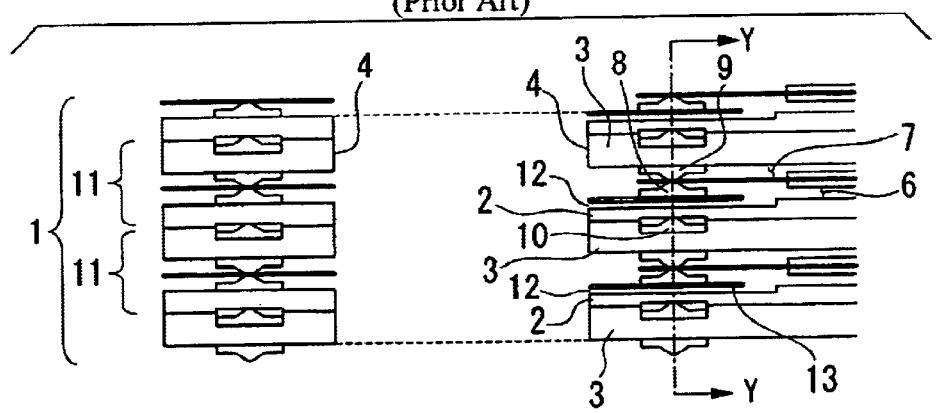
FIG. 36 is a longitudinal cross-sectional view, showing the vicinity of a fuel gas supply port in the fuel cell stack shown in FIG. 35, taken along the line X—X.
Figure 37:
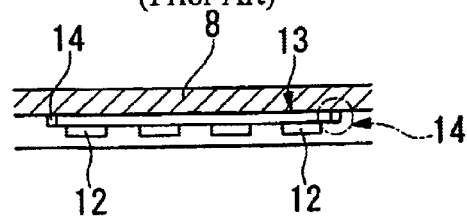
FIG. 37 is a longitudinal cross-sectional view, showing the major portion of the vicinity of the fuel gas supply port in the fuel cell stack shown in FIG. 36, taken along the line Y—Y.

Next, FIGS. 33 and 34 show the eleventh embodiment of the present invention, respectively corresponding to FIGS. 12 and 13 showing the first embodiment. As in the seventh embodiment, in this embodiment as well, the separators 23 and 24 are made by press forming stainless steel plates. Moreover, the cathode electrode 31 is made as large as the electrolyte membrane 29 as in the sixth embodiment. Accordingly, the manufacturing process may be simplified, and the dimensions of the fuel cell stack 20 in the stacking direction may be reduced. Moreover, because the gas sealing member 25 can be pressed against the electrolyte membrane 29 with more pressure, the sealing performance can be increased. Furthermore, as in the first embodiment, in this embodiment as well, it is possible to reduce the dimensions of the fuel cell stack 20 in the stacking direction while improving the sealing performance by ensuring the sealing function of the gas sealing member 25.

INDUSTRIAL APPLICABILITY

As explained above, according to the fuel cell stack in the first aspect of the present invention, because the gas sealing member can be securely bonded to the predetermined position on the separator while preventing deformation of the gas sealing member during formation thereof, the sealing performance of the gas sealing member is improved. Moreover, in the other separator, the reaction gas need not flow along the rear surface (the surface to be cooled) of this separator, and the cooling surface sealing member need not be formed at a position overlapping with the reaction gas flow passage, i.e., the cooling surface sealing member may be located so as to be offset, as viewed in the stacking direction, from the reaction gas flow passage. Therefore, the dimensions of the fuel cell stack in the stacking direction can be reduced by the amount saved by the above-mentioned offset disposition.

According to the fuel cell stack in the second aspect of the present invention, because the gas sealing member can be pressed against the electrolyte while ensuring the strength of the electrolyte in the thickness direction thereof, the durability of the electrolyte can be improved, and consequently the reliability of the fuel cell stack can be improved.

According to the fuel cell stack in the third aspect of the present invention, because the gas sealing member that is bonded to the one separator and that has a sufficient sealing performance is pressed against the electrode assembly as well as against the other separator, flowing out of the reaction gases to the outside can be reliably prevented by the gas sealing member, and consequently the reliability of the fuel cell stack can be improved.

What is claimed is:

1. A fuel cell formed by stacking a plurality of fuel cell units, each fuel cell unit comprising:
   an electrode assembly formed by disposing electrodes on both sides of an electrolyte;
   a pair of separators that sandwich the electrode assembly in the thickness direction thereof; and
   gas sealing members that are disposed at an outer peripheral portion of the electrode assembly, and that seal respective reaction gas flow passages that are formed between each separator and the electrode assembly and are bounded by the separators and electrode assembly, wherein,
   in each of the separators there are provided reaction gas communication ports that are provided outward from the gas sealing members,
   in one separator, through paths are formed that penetrate the separator in the thickness direction thereof and connect the reaction gas communication ports with the reaction gas flow passages, and
   in the other separator, reaction gas communication paths are formed that detour around the gas sealing member in the thickness direction of the separator and connect the reaction gas communication ports with the reaction gas flow passages.

2. The fuel cell according to claim 1, wherein, in the electrodes forming the electrode assembly, the planar area of one electrode is formed to be larger than that of the other electrode by an amount corresponding to at least the width of the gas sealing member (26).

3. The fuel cell according to claim 1, wherein the gas sealing member is provided such that the gas sealing member is bonded to the one separator and is pressed against the electrode assembly as well as against the other separator.

4. The fuel cell according to claim 2, wherein the gas sealing member is provided such that the gas sealing member is bonded to the one separator and is pressed against the electrode assembly as well as against the other separator.

5. The fuel cell according to claim 1, wherein a cooling medium flow passage for cooling the fuel cell units is formed in every space between the fuel cell units adjacent to each other.

6. The fuel cell according to claim 1, wherein two or more fuel cell units form a group of fuel cell units, and a cooling medium flow passage for cooling the fuel cell units is formed in every space between adjacent groups of fuel cell units.

7. The fuel cell according to claim 1, wherein, in the electrodes forming the electrode assembly, the planar area of one electrode is formed as substantially the same size as that of the electrolyte.

8. The fuel cell according to claim 1, wherein the separators are formed of metal plates by press forming.

* * * * *